(12) United States Patent
Mowry

(10) Patent No.: US 8,447,648 B1
(45) Date of Patent: May 21, 2013

(54) METHOD AND SYSTEM FOR ELICITING CONSUMER DATA BY PROGRAMMING CONTENT WITHIN VARIOUS MEDIA VENUES TO FUNCTION COOPERATIVELY

(75) Inventor: Craig P. Mowry, Southampton, NY (US)

(73) Assignee: Home Producers Network, LLC, Scottsdale, AZ (US)

( * ) Notice: Subject to any disclaimer, the term of this patent is extended or adjusted under 35 U.S.C. 154(b) by 833 days.

(21) Appl. No.: 12/507,549

(22) Filed: Jul. 22, 2009

Related U.S. Application Data

(63) Continuation of application No. 09/808,538, filed on Mar. 14, 2001, now Pat. No. 7,720,707, which is a continuation-in-part of application No. 09/756,581, filed on Jan. 8, 2001, now abandoned.

(60) Provisional application No. 60/175,093, filed on Jan. 7, 2000, provisional application No. 60/176,440, filed on Jan. 14, 2000, provisional application No. 60/189,060, filed on Mar. 14, 2000, provisional application No. 60/212,663, filed on Jun. 20, 2000, provisional application No. 60/226,672, filed on Aug. 22, 2000.

(51) Int. Cl.
*G06Q 30/00* (2012.01)
*G07G 1/14* (2006.01)

(52) U.S. Cl.
USPC ........................................ 705/14.1; 705/14.4

(58) Field of Classification Search
USPC .......................................................... 705/14
See application file for complete search history.

(56) References Cited

U.S. PATENT DOCUMENTS

| | | | |
|---|---|---|---|
| 5,041,972 A | 8/1991 | Frost | |
| 5,661,516 A | 8/1997 | Carles | |
| 5,717,923 A | 2/1998 | Dedrick | |
| 5,724,424 A | 3/1998 | Gifford | |
| 5,754,939 A | 5/1998 | Herz et al. | |
| 5,774,170 A | 6/1998 | Hite | |
| 5,784,095 A * | 7/1998 | Robbins et al. | 725/49 |

(Continued)

FOREIGN PATENT DOCUMENTS

| | | |
|---|---|---|
| AU | 2002357397 | 7/2003 |
| AU | 2003293160 | 11/2003 |

(Continued)

OTHER PUBLICATIONS

Cirit, et al., "Consumer Profiling Using Fuzzy Query and Social Network Techniques," 6 pages, 2005.

(Continued)

*Primary Examiner* — Arthur Duran

(57) ABSTRACT

Disclosed is an interactive venue individuals. At least one database stores trait information, preference information, and identification information that includes visual and/or audio information. The database also stores advertiser information that includes information representing at least one of goods and services of one or more advertisers. Video media is provided that features at least one participant. The participant is at least one of the plurality of persons. Further, a web site is provided that shows at least part of the video media and at least some of the electronic advertiser information. Some of the electronic advertiser information corresponds to at least one selected from the group consisting of the at least one participant and at least one user of the web site.

33 Claims, 22 Drawing Sheets

U.S. PATENT DOCUMENTS

| | | | |
|---|---|---|---|
| 5,794,210 A | 8/1998 | Goldhaber et al. | |
| 5,805,974 A | 9/1998 | Hite | |
| 5,848,397 A | 12/1998 | Marsh et al. | |
| 5,852,775 A | 12/1998 | Hidary | |
| 5,855,515 A * | 1/1999 | Pease et al. | 463/27 |
| 5,931,901 A | 8/1999 | Wolfe et al. | |
| 5,956,691 A | 9/1999 | Powers | |
| 5,974,398 A | 10/1999 | Hanson et al. | |
| 6,002,393 A | 12/1999 | Hite | |
| 6,020,884 A | 2/2000 | MacNaughton et al. | |
| 6,038,591 A | 3/2000 | Wolfe et al. | |
| 6,052,122 A | 4/2000 | Sutcliffe et al. | |
| 6,105,001 A | 8/2000 | Masi et al. | |
| 6,112,186 A * | 8/2000 | Bergh et al. | 705/7.32 |
| 6,128,600 A * | 10/2000 | Imamura et al. | 705/26.41 |
| 6,161,142 A | 12/2000 | Wolfe et al. | |
| 6,161,149 A | 12/2000 | Achacoso | |
| 6,175,831 B1 | 1/2001 | Weinreich et al. | |
| 6,193,610 B1 * | 2/2001 | Junkin | 463/40 |
| 6,216,133 B1 | 4/2001 | Masthoff | |
| 6,236,975 B1 * | 5/2001 | Boe et al. | 705/7.32 |
| 6,236,978 B1 | 5/2001 | Tuzhilin | |
| 6,269,361 B1 | 7/2001 | Davis et al. | |
| 6,288,717 B1 | 9/2001 | Dunkle | |
| 6,321,221 B1 * | 11/2001 | Bieganski | 705/26.7 |
| 6,324,566 B1 | 11/2001 | Himmel et al. | |
| 6,338,094 B1 * | 1/2002 | Scott et al. | 709/245 |
| 6,351,736 B1 | 2/2002 | Weisberg | |
| 6,411,949 B1 | 6/2002 | Schaffer | |
| 6,466,918 B1 * | 10/2002 | Spiegel et al. | 705/7.29 |
| 6,480,785 B1 | 11/2002 | Joerg et al. | |
| 6,487,539 B1 | 11/2002 | Aggarwal et al. | |
| 6,519,629 B2 | 2/2003 | Harvey et al. | |
| 6,527,557 B2 | 3/2003 | Lemay et al. | |
| 6,546,545 B1 | 4/2003 | Honarvar et al. | |
| 6,601,037 B1 | 7/2003 | Kolls | |
| 6,604,086 B1 | 8/2003 | Kolls | |
| 6,606,605 B1 | 8/2003 | Kolls | |
| 6,609,103 B1 | 8/2003 | Kolls | |
| 6,609,120 B1 | 8/2003 | Honarvar et al. | |
| 6,615,183 B1 | 9/2003 | Kolls | |
| 6,625,581 B1 * | 9/2003 | Perkowski | 705/27.1 |
| 6,628,314 B1 | 9/2003 | Hoyle | |
| 6,629,080 B1 | 9/2003 | Kolls | |
| 6,681,369 B2 | 1/2004 | Meunier et al. | |
| 6,684,197 B1 | 1/2004 | Kolls | |
| 6,694,482 B1 * | 2/2004 | Arellano et al. | 715/251 |
| 6,757,661 B1 | 6/2004 | Blaser et al. | |
| 6,771,290 B1 | 8/2004 | Hoyle | |
| 6,772,229 B1 | 8/2004 | Achacoso | |
| 6,792,411 B1 | 9/2004 | Massey, Jr. | |
| 6,807,532 B1 | 10/2004 | Kolls | |
| 6,834,110 B1 * | 12/2004 | Marconcini et al. | 380/239 |
| 6,871,186 B1 | 3/2005 | Tuzhilin et al. | |
| 6,873,965 B2 | 3/2005 | Feldman et al. | |
| 6,886,000 B1 | 4/2005 | Aggarwal et al. | |
| 6,901,406 B2 | 5/2005 | Nabe et al. | |
| 6,925,468 B1 | 8/2005 | Bobbitt et al. | |
| 6,930,676 B2 | 8/2005 | De Haan et al. | |
| 6,947,976 B1 | 9/2005 | Devitt et al. | |
| 6,952,741 B1 | 10/2005 | Bartlett et al. | |
| 6,968,313 B1 | 11/2005 | Oran | |
| 6,968,315 B1 | 11/2005 | Nakisa | |
| 6,970,844 B1 | 11/2005 | Bierenbaum | |
| 6,973,439 B1 | 12/2005 | Wilk | |
| 6,976,439 B2 | 12/2005 | Uchida | |
| 6,999,987 B1 | 2/2006 | Billingsley et al. | |
| 7,003,546 B1 | 2/2006 | Cheah | |
| 7,006,979 B1 | 2/2006 | Samra et al. | |
| 7,014,469 B1 | 3/2006 | Nocera et al. | |
| 7,031,651 B2 | 4/2006 | McCormick et al. | |
| 7,043,531 B1 | 5/2006 | Seibel et al. | |
| 7,054,831 B2 * | 5/2006 | Koenig | 705/14.5 |
| 7,054,900 B1 | 5/2006 | Goldston | |
| 7,082,427 B1 | 7/2006 | Seibel et al. | |
| 7,085,820 B1 | 8/2006 | Nickerson et al. | |
| 7,095,426 B1 | 8/2006 | Childress | |
| 7,120,629 B1 | 10/2006 | Seibel et al. | |
| 7,158,986 B1 | 1/2007 | Oliver et al. | |
| 7,231,608 B1 | 6/2007 | Fano et al. | |
| 7,236,969 B1 | 6/2007 | Skillen et al. | |
| 7,318,224 B2 | 1/2008 | Honarvar et al. | |
| 7,321,233 B2 | 1/2008 | Strid et al. | |
| 7,330,850 B1 | 2/2008 | Seibel et al. | |
| 7,337,127 B1 | 2/2008 | Smith et al. | |
| 7,356,541 B1 | 4/2008 | Doughty | |
| 7,398,219 B1 | 7/2008 | Wolfe | |
| 7,430,514 B1 | 9/2008 | Childress et al. | |
| 7,451,094 B2 | 11/2008 | Royall, Jr. et al. | |
| 7,475,032 B1 | 1/2009 | Patnode et al. | |
| 7,603,331 B2 | 10/2009 | Tuzhilin et al. | |
| 7,752,326 B2 | 7/2010 | Smit | |
| 8,005,896 B2 | 8/2011 | Cheah | |
| 8,015,495 B2 | 9/2011 | Achacoso | |
| 8,103,611 B2 | 1/2012 | Tuzhilin et al. | |
| 8,150,913 B2 | 4/2012 | Cheah | |
| 2001/0013009 A1 | 8/2001 | Greening et al. | |
| 2001/0032115 A1 | 10/2001 | Goldstein | |
| 2001/0042002 A1 | 11/2001 | Koopersmith | |
| 2001/0056374 A1 * | 12/2001 | Joao | 705/14 |
| 2002/0059379 A1 | 5/2002 | Harvey et al. | |
| 2002/0059621 A1 | 5/2002 | Thomas et al. | |
| 2002/0065894 A1 | 5/2002 | Dalal et al. | |
| 2002/0088010 A1 | 7/2002 | Dudkiewicz et al. | |
| 2003/0003990 A1 * | 1/2003 | Von Kohorn | 463/25 |
| 2003/0023489 A1 | 1/2003 | McGuire et al. | |
| 2003/0061215 A1 | 3/2003 | Messina | |
| 2003/0142664 A1 * | 7/2003 | Gerszberg et al. | 370/354 |
| 2004/0128624 A1 * | 7/2004 | Arellano et al. | 715/530 |
| 2004/0133471 A1 | 7/2004 | Pisaris-Henderson et al. | |
| 2004/0148366 A1 * | 7/2004 | Ross et al. | 709/218 |
| 2004/0215514 A1 * | 10/2004 | Quinlan et al. | 705/14 |
| 2004/0249719 A1 | 12/2004 | Urpani | |
| 2004/0261127 A1 * | 12/2004 | Freeman et al. | 725/135 |
| 2005/0080845 A1 * | 4/2005 | Gopinath | 709/201 |
| 2005/0125310 A1 * | 6/2005 | Hazi et al. | 705/27 |
| 2005/0125354 A1 | 6/2005 | Pisaris-Henderson et al. | |
| 2006/0026067 A1 | 2/2006 | Nicholas et al. | |
| 2006/0090013 A1 | 4/2006 | Achacoso et al. | |
| 2007/0073581 A1 | 3/2007 | Kempe et al. | |
| 2007/0093258 A1 | 4/2007 | Steenstra et al. | |
| 2007/0118420 A1 | 5/2007 | Jung et al. | |
| 2007/0130002 A1 | 6/2007 | Moran et al. | |
| 2007/0208610 A1 | 9/2007 | Pisaris-Henderson et al. | |
| 2007/0239537 A1 | 10/2007 | Protheroe et al. | |
| 2008/0033815 A1 | 2/2008 | Choi | |
| 2008/0033826 A1 | 2/2008 | Maislos et al. | |
| 2008/0228708 A1 * | 9/2008 | Kenedy et al. | 707/2 |
| 2009/0012841 A1 | 1/2009 | Saft et al. | |
| 2009/0018918 A1 | 1/2009 | Moneypenny et al. | |
| 2009/0030774 A1 | 1/2009 | Rothschild et al. | |
| 2009/0030775 A1 | 1/2009 | Vieri | |
| 2009/0030972 A1 | 1/2009 | Rogers | |
| 2009/0043648 A1 | 2/2009 | Mahdian et al. | |
| 2009/0055249 A1 | 2/2009 | Lieberman | |
| 2009/0063283 A1 | 3/2009 | Kusumoto et al. | |
| 2009/0063284 A1 | 3/2009 | Turpin et al. | |
| 2009/0067599 A1 | 3/2009 | Agarwal et al. | |
| 2009/0076899 A1 | 3/2009 | Gbodimowo | |
| 2009/0076902 A1 | 3/2009 | Grinsted et al. | |
| 2012/0150593 A1 * | 6/2012 | Alvin | 705/14.1 |

FOREIGN PATENT DOCUMENTS

| | | |
|---|---|---|
| JP | 2004533020 | 10/2004 |
| WO | WO 02/104005 | 12/2002 |
| WO | WO 03/058531 | 7/2003 |
| WO | WO 2004/021152 | 3/2004 |
| WO | WO 2004/051418 | 6/2004 |
| WO | WO 2005/043341 | 5/2005 |

OTHER PUBLICATIONS

Klaas Kox, HAIT Master Thesis series nr. 08-005, "Mobile Contextual Advertising," Tilburg University, Tilburg, The Netherlands, Dec. 2008, 28 pages.

http://www.google.com/press/pressrel/pressrelease39.html, Google Launches Self-Service Advertising Program, Oct. 23, 2000.

Upendra Shardanand and Pattie Maes, MIT Media-Lab, "Social Information Filtering: Algorithms for Automating 'Word of Mouth,'" May 7-11, 1995, CHI '95 Mosaic of Creativity, pp. 210-217.
http://m.wired.com/magazine/2010/07/ff_caterina_fake/Devin Leonard, What You Want: Flickr Creator Spins Addictive New Web Service, Jul. 28, 2010, pp. 1-5.
http://web.archive.org/web/19981212013921/http://facebook.com/.
http://web.archive.org/web/19990125085655/http://facebook.com/.
http://web.archive.org/web/19990208013055/http://www.facebook.com/.
http://web.archive.org/web/19990825020910/http://facebook.com/index.html.
http://web.archive.org/web/20000414064120/http://facebook.com/index.html.
Encyclopedia of Library and Science, vol. 71, Allen Kent, p. 156 (2002).
http://en.wikipedia.org/wiki/Keyword_advertising.
http://news.cnet.com/Pay-for-replacement-gets-another-shot/2100-1023_3-208309.html.
http://sigchi.org/chi95/proceedings/papers/us_bdy.htm.

* cited by examiner

Example Search Screen Flow - USER side of the system

A. SIGN IN and SEARCH or JOIN option prompt

B. USER SIMILARITY PROMPT

C. SCOPE OF DATABASE PROMPT

D. JOIN SOLICITATION and initial preference question prompt to user

E. TRAIT OPTION SCREEN defining micro-demographic to search

F. VARIABLE TRAIT selection screen, narrowing variable based target demo group

G. FACTOID advertisement deemed relevant to USER based on data collected to this point H. PREFERENCE MENU SCREEN wherein user selects personal preference and personal issue areas of interest related to their micro-demographic.

I. FACTOID advertisement selectively relevant to the indicated preference areas and the users' indicated micro-demographic.

J. RESULTS SCREEN related to data correlation of preferences regarding the users' micro-demographic group and the areas of interest selected in prefereneces menu. Option of selecting a result to further correlate that result to the users' micro-demographic group.

K. TOP TEN, or selected amount of closest correlating members to the users' micro-demographic parameters, who selected a preference aspect.

L. SELECTED DATABASE MEMBER deemed of interest by the user, likely based on photo featured and/or selected data featured in the "top 10" database members screen provided. This member's areas of personal preference and personal feedback collected are featured for the user to select, toward reviewing long form and provided options feedback from the member in this area M. LONG FORM FEEDBACK is provided related to a selected area of personal preference.

N. OPTIONS of cross referencing this new area of preference with the users' micro-demographic as a whole and other database option such as the review of other preference data of members selectively similar to a selected single member, changing the micro-demographic completely to be relevant to the traits of another member, are given.

O. OPTIONS to return to preference screen and other phases of the search to begin with new preference areas, or a new micro-demographic should a return to the TRAIT screen be selected.

FIG.1

Example JOIN Data-Input Screen Flow - MEMBER side of the system

A. TRAITS OF MEMBER MENU and feedback screen

B. PREFERENCES OF MEMBER MENU and feedback screen and sub-screens for longer form feedback C. SUMISSION OF PHOTO and/or other visual or audio data for posting within the member's searchable profile within database D. MEMBERS' incentive point accrual total E. MEMBERS' example redemption option prompt screen F. MEMBERS' full redemption catalog G. MEMBERS' incoming e-mail from USERS, wherein responding to such mail provides additional incentive points to the member.

H. ADVERTISING posting agreeably received by point accruing members, example

I. POSTING BOARD uniquely assembled for MEMBER based on trait and preference data collected regarding the member

FIG.2

I am curious about the following things about my requested type:

RANKING: A B C

AGE
HEIGHT
WEIGHT
BODY TYPE
SHOPPING HABITS
PERSONAL STYLE
SEXUAL PREFERENCE
FAMILY STATUS / WEALTH
HATES
LOVES
PERSONAL PROBLEMS
DEMEANOR
GPA OR SMARTS
TALENTS
DREAMS
etc.
etc.
etc.
write in
write in BACK to previous screen As the searcher clicks the "c" importance option on DEMEANOR, the variable options to select from appear.

FIG. 6

POP UP SCREEN :

I would like to focus my search to the following:

☐ ALL MEMBERS IN THE DATABASE

☒ TOP 10 CLOSEST MATCHES TO MY DEMO

☐ TOP 50 CLOSEST MATCHES

☐ TOP 100 CLOSEST MATCHES

☐ TOP 5% CLOSEST TO MY DEMO

☐ TOP 10% CLOSEST TO MY DEMO

☐ TOP 15% CLOSEST TO MY DEMO

☐ Include only members who gave long form feedback on answers

■ Include only members with photos or video

---

MUSIC ITEMS AVAILABLE-click item to order with points and/or cash
(Pay $5 per 10 points extra)

☐ CD singles   150 points
☐ full Cd's    500 points
☐ DOWNLOAD singles 50 points
☐ VIP passes at concerts 200 pts
☐ AUTOGRAPHED items 500 pts
☐ etc, etc.

FIG.8

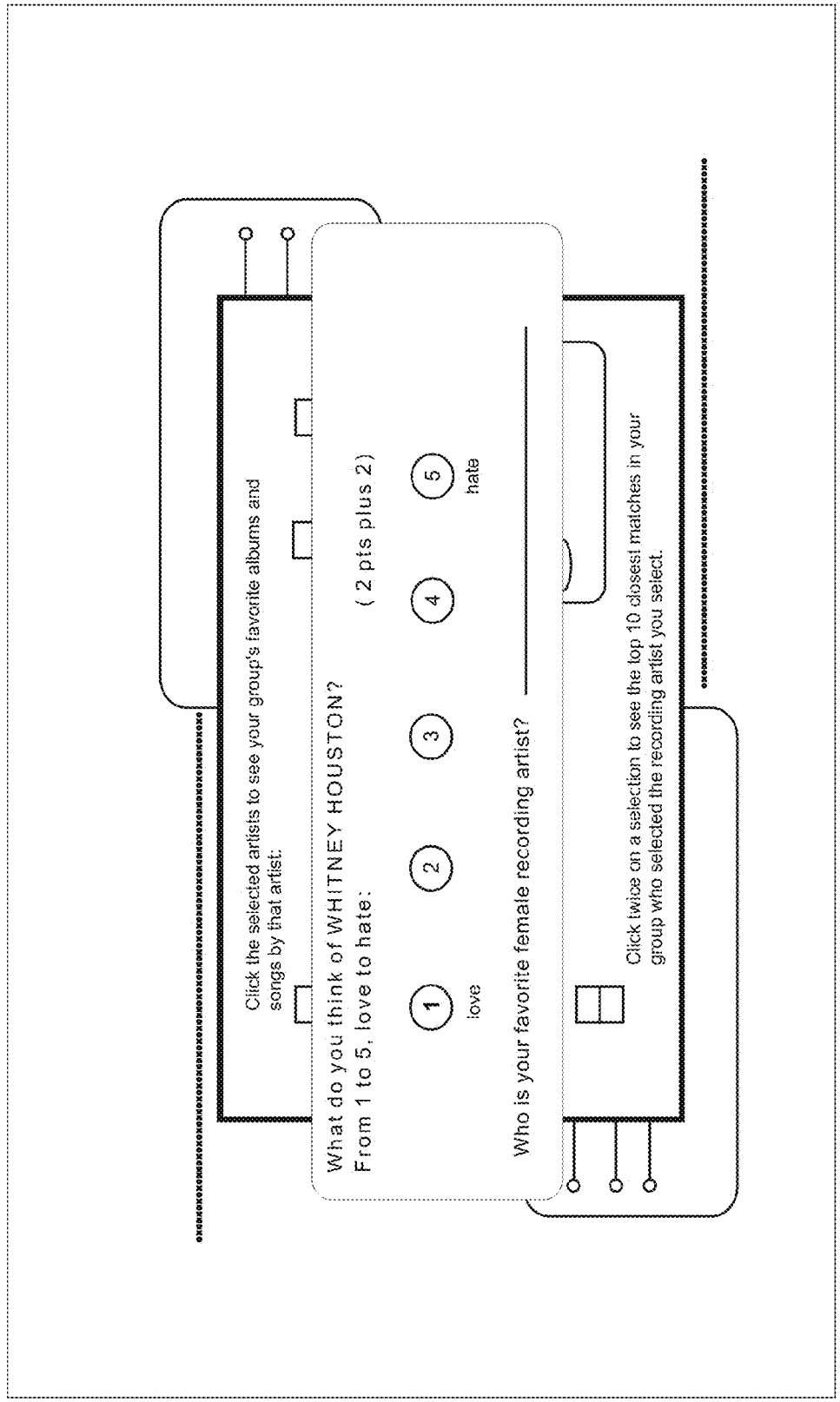

SCREEN 7

| PHOTO | JOE 1 | PHOTO | PETE 7 |
| PHOTO | JIM 2 | PHOTO | DAVID 8 |
| PHOTO | KELLY 3 | PHOTO | WHIT 9 |
| PHOTO | BILL 4 | PHOTO | PARKER 10 |
| PHOTO | TONY 5 | | These are the top ten closest matches to your selected group who chose IN SYNCH as their favorite group. Click to find out other info on these members |
| PHOTO | RICH 6 | | |

SEARCHER SELECTION, BASED ON PHOTO, IS PETE.

POP UP SCREEN:

CLICK here to see why people like PETE prefer [COKE] over other sodas, and other info about people like PETE

Fig.12

The searcher has selected group's CARS preferences

FIG. 17

Fig. 18 - *The SITE*

Fig. 20 *LiveVideo Flow & Recorded Video Flow*

METHOD AND SYSTEM FOR ELICITING CONSUMER DATA BY PROGRAMMING CONTENT WITHIN VARIOUS MEDIA VENUES TO FUNCTION COOPERATIVELY

RELATED APPLICATIONS

This application is a continuation of application Ser. No. 09/808,538, filed Mar. 14, 2001, now U.S. Pat. No. 7,720,707, issued May 18, 2010 the contents of which are herein incorporated by reference, which is a continuation in part of application Ser. No. 09/756,581, filed Jan. 8, 2001 now abandoned, the contents of which are incorporated herein by reference, which claims priority from Application Ser. Nos. 60/175,093, filed Jan. 7, 2000, 60/176,440, filed Jan. 14, 2000, 60/189,060, filed Mar. 14, 2000, 60/212,663, filed Jun. 20, 2000, and 60/226,672, filed Aug. 22, 2000, the contents of all of which are incorporated herein by reference.

BACKGROUND OF THE INVENTION

1. Field of the Invention

The present invention relates to an interactive communication network-based marketing system and method, and more specifically, to a system and method in which a web site and live program are arranged in the form of a game which captures marketing data from system users and promotes those products and services which are favorably viewed by a corresponding demographic community.

The present invention further relates to a system and method for referencing consumer preference data and merchandise and service "popularity" according to human physical and emotional characteristics, traits and personal preferences. In essence an animate, or "HUMAN" cataloging and method/system for researching and locating purchasable items and preference data, rather than an inanimate one. This system and method would preferably be Internet based, presented as a special Internet address and destination, comprising a "search engine," or searching means based on "searcher" or Internet user supplied human trait and preference data parameters.

2. Description of the Related Art

Many Internet sites, i.e., web sites, provide limited services and limited entertainment options due typically to site configurations based on singular or limited objectives. The value of an audience from a target demographic participating in a single site cannot be underestimated nor should it be narrowed to such limited objectives, services and benefit to site users.

The number of site participants, the time the participants spend at a single site and the degree of interactivity with the site have typically been the key variables exploited from the perspective of the site participant (user).

Increasing potential revenue, services and entertainment value to the user beyond those variables must therefore lie in creating a multi-leveled, or multi-dimensional site.

In cooping various media to create a new multi-media venue, a target demographic can potentially be sampled with startling speed and with unfaltering accuracy. Existing sites and attempts at "convergence" between television and the Internet have failed to exploit the cooping potential of these media. Also, the demographic sampling potential for a variety of information needs, including product and service preferences, has been all but untapped to date.

The present invention involves a new multimedia venue to sample, sell, educate and entertain both site users and television viewers having a common demographic.

Current "e commerce" or computer based electronically transacted business options, and related inventions thereof, are limited in scope typically with regard to the indexing and cataloging of merchandise and services. Further, "search engines" familiar to Internet users, are limited often to search results based on correlation between words or phrases submitted by the user, relative to those assigned to Internet accessible sites and data banks.

In a society of individuals who make many decisions based on dynamics of personal competition and success, and interpersonal comparison, the need for a searching means to reference information based on traits and preferences of other individuals, and groups of individuals, would clearly be valuable and of interest to many. The most compelling lure of entertainment and advertising, is information about other individuals that might be considered "private" or personal, whether they be celebrities or not. Television programs and advertising that is "revealing," especially those focused to the negative feelings and occurrences of others, are remarkably successful: "Rubber-necking" on a highway also demonstrates the public's often macabre fascination with the plight or misfortune of others. The same can be said with the public's fascination with the success of others, mostly relative to their own circumstances and personal esteem.

The means to search personal preference and "feelings" data of actual individuals, would allow the Internet user new options in discovering the behavioral and purchasing preferences of individuals similar to themselves, or similar to a person or "type" of person relevant to the user: Those of romantic interest to an internet user/searcher, and those who the Internet user may be competitive with, are two examples of searching parameter bases that may be relevant to a particular individual searching via such newly available means. Further, peripheral areas of interest may be discovered by users as they discover selected personal data about their designated "types" of people-leading Internet searchers to revelations steered by the options displayed by such a system and searching means.

For Internet advertising, the relevance of being able to target user determined and defined micro-demographics is invaluable. A searcher who has defined their own dynamics demographically, in order to accomplish their search, could receive selected advertisements in editorially prepared formats, to maintain the highest degree of personal relevance and potential interest, unlike the generally poorly focused myriad of solicitations broadcast to millions of Internet users and mail box holders.

To date, all demographic specific devises on the Internet are geared to "sampling" and looking at the Internet users from the data-seekers' vantage point. The present invention addresses the interest and need of the Internet user to personally discover discreet demographic preference and behavioral data relative to their own personal objectives and interests: An active demographic specific vehicle from the consumers' point of view, instead of a passive one where their activity and data is sampled and they are categorized and solicited according to the interpretation and interests of unseen others—typically larger Internet based firms and advertisers.

SUMMARY OF THE INVENTION

Accordingly, a system and method are disclosed for individuals to interact via an interactive venue, such as a web site. In an embodiment, at least one database is stored on one or more processor readable media that are operatively coupled to one or more processor. The database comprises electronic trait information that includes information representing traits of a plurality of persons. The database also comprises electronic preference information that includes information representing preferences of the plurality of persons. Further, the database comprises electronic identification information that includes at least one of visual and audio information representing at least one person of the plurality of persons. Also, the database comprises electronic advertiser information that includes information representing at least one of goods and services of one or more advertisers.

The system and method further include providing video media that may include live video featuring at least one participant. The participant is at least one of the plurality of persons. The system and method further include providing a web site linked to the internet that shows at least part of the video media as a function of at least some of the electronic advertiser information. In an embodiment, the at least some of the electronic advertiser information corresponds to at least one selected from the group consisting of the at least one participant and at least one user of the web site.

The system and method further include establishing a first web site session with the first user computing device, and a second web site session with the second user computing device. Electronic responsive information is received from the first computing device that relates to at least part of the video media and that includes first user identification information that at least represents the first user. Further, first electronic preference information is transmitted by the processor(s) to the second user, that relates to the at least part of the video media content, the at least some advertiser information and the electronic responsive information.

Other features and advantages of the present invention will become apparent from the following description of the invention that refers to the accompanying drawings.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown, wherein:

FIG. 1 is a block diagram illustrating the preferred sequence of interactive prompts, or Internet screens, presented to an Internet "searcher" or user, accessing the database of the present invention in search of specific preference and opinion data.

FIG. 2 is a block diagram illustrating the preferred sequence of interactive prompts encountered by an Internet user who might be supplying data to the database of the present invention, resulting in a specific data profile of that individual, in exchange for incentives.

FIGS. 3 through 16 illustrate the preferred interactive, Internet screens encountered during a search utilizing the present system and method.

FIG. 3 illustrates a preferred "sign in screen" related to an interacting Internet site based on the present invention.

FIG. 4 illustrates a preferred Internet screen that would prompt a user to identify if data being sought might be related to themselves, allowing for the building of a profile of the searcher, based on the searcher's own search parameters and interaction.

FIG. 5 illustrates a preferred solicitation for data from a user searching the database, to sample the searchers toward completing database relevant profiles of them, perhaps in exchange for the useful data supplied to them during their search.

FIG. 6 illustrates a preferred Internet screen prompting a user to provide trait-related data defining the demographic, or micro-demographic group of interest to that user for the search. The screen further prompts the user, selectively, to assign A, B or C importance to the traits they select, C being the highest degree of importance in this scenario.

FIG. 7 illustrates a secondary Internet screen prompt, requesting more discreet data from a user for the searching parameters with regards to a selected demographic defining trait, in this instance, "demeanor." FIG. 7 further illustrates a FACTOID advertisement, or flash advertisement provided in a database and user search relevant format to maintain the highest degree of relevance for the user. Linking means are also provided in this example, to the site of the advertiser who has been featured in this FACTOID deemed relevant enough to present to this Internet user, based on their feedback through the system to this point.

FIG. 8 demonstrates interactive variables that may be provided to users in further defining the demographic, or micro-demographic of relevance to their searching needs. In this scenario, options including narrowing the sample group based on the user supplied trait variable parameters based on a selected number of database profiles (or people,) or a selected percentage of the total database deemed by system parameters to be most similar to the user-defined micro-demographic. Further, the option to further narrow the sampling based on secondary variables, such as those database profiles that include photos or visual data, is demonstrated. FIG. 8 further demonstrates a menu for selecting items available for redemption with points accrued from an incentive program designed to solicit data in to the database from users, in exchange for redeemable points, or the like. This demonstrates the promotion of the data accrual needs of the database, to grow and evolve it in to a more discreet and comprehensive Internet user and advertiser resource.

FIG. 9 illustrates a preferred interactive Internet screen that would allow users to define the areas of opinion and/or preference information personally relevant to that user pertaining to the demographic group that user has already defined by providing trait and/or other demographic defining parameters. FIG. 9 further demonstrates the continual options provided to users, such as redefining their demographic of interest, sending mail to their uniquely defined demographic among other Interactive options to maintain the user as the one controlling both the search parameters and the direction of the searching process. In FIG. 9, the user has selected "music" as an area of preference data interest.

FIG. 10 illustrates a FACTOID presented by the system to this particular user, based on a system determination that the user supplied data to this point in the search warranted this particular data FACTOID featuring this particular advertiser and link, to be relayed to this user. This FACTOID further demonstrates the preferred format and level of trivia and user-relevant interest that these unique advertising vehicles, tied to information from the database, may provide.

FIG. 11B illustrates a selected "focus group" study prompt, provided to this particular user, the user having met requirements to be considered relevant to the focus group data gathering needs. Naturally, this service and function of the present invention is a revenue aspect, allowing advertisers and brands to derive incredibly discreet demographic specific feedback virtually immediately, by way of services based on the present invention.

FIG. 12 illustrates a scenario wherein the top ten database members, or individual with both profiles and photo data within the database, are displayed. "Top ten" being defined by members meeting trait and preference criteria supplied by the user in their search. FIG. 12 further illustrates a FACTOID advertisement that appears when the user selects a member from the ten, who has a profile that allows selectively relevant database information to be featured that is relevant to the user now, because the user has shown interest in a specific database member, or profile, wherein the particular preference featured in the factoid is an aspect of that member's feedback and profile. The further option of reviewing information related to an entirely new demographic sampling, in this instance "people like Pete," opens the option of selectively relevant data being relayed to the user having the impact of redefining the areas of search and preference curiosity for the user.

FIG. 13 illustrates a detailing of opinion and preference data the individual member, or selected profile, contains. On selecting a new area of preference interest, "cars," prompted from the list of available data related to the selected member profile, in this scenario the user receives the option of reviewing data from the users ORIGINALLY defined demographic group in relation to the NEWLY selected preference/opinion venue.

FIG. 14 details subsequent, more detailed "long form," or keyed-in feedback within an individual database member profile that a user may access. FIG. 14 further demonstrates a user selecting the system supplied prompt of reviewing the selected preference in relation to the originally defined demographic. This aspect is an illustration of the preferred effect of user pro-activity and advertiser friendly system prompts to users, creating an illusion of control for users over a search that is steered by the system toward areas of revenue for the system and applications of the present invention, however subtle and covert to not destroy the editorial integrity of the search relevance to a user.

FIG. 15 illustrates selected results in the selected preference area, "cars," related to the user's originally defined demographic group of interest. Linking means to selected advertisers who appear within the overall list of preference results is demonstrated as well, providing added value to those brands over those who were listed but were not advertisers, for example.

FIG. 16 details further system supplied prompted options for a user to refine their demographic of interest, and feedback venues or preference areas related to the groups selected and correlated. These options further demonstrate a balance between "editorial" and "advertising," as options are provided to expand the proactive searching means for the user, though the options provided may serve discreet and specific areas of interest for the system to "guide" a user, or users, for revenue purposes.

FIG. 17 demonstrates a simple correlation between and user's trait-based searching parameters in defining a demographic, and the applicable data within a member's profile, in determining relevance of this particular member to the search.

DETAILED DESCRIPTION OF EMBODIMENTS OF THE INVENTION

Figure 3:
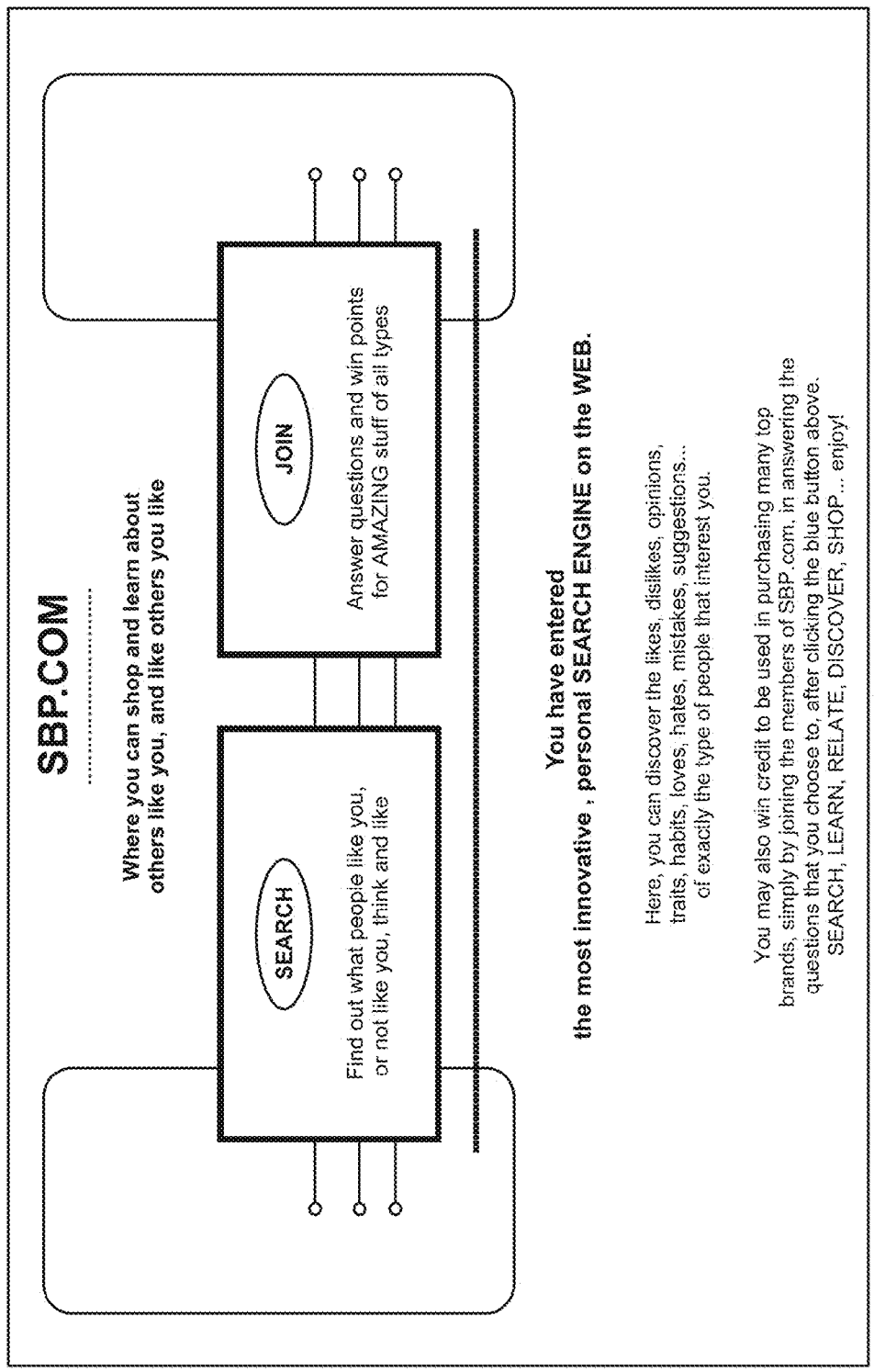

Audience "viewership" split between media venues is brought together within a new, potent "multi-media coop" providing an enhanced interactive audience by way of a new combination of the benefits and dynamics of existing media venues, usually kept separate and distinct.

By involving an Internet site in the programming of a live television program, for instance, the opportunity for the demographic being sampled to function as the writers, or "programmers," creates a new type of entertainment program. In making products and services an element of the content that the demographic is programming, through their feedback over the Internet, members of a shared demographic express preferences and give immediate feedback while simultaneously being entertained.

An object of the present invention is to provide new Internet services and new options for data sampling and interactive involvement among Internet users; preferably having a common demographic. Further, the present invention provides for the creation of an electronic catalog of purchasable or auctionable items merchandised completely based on the preferences of the target demographic, as expressed through feedback on a linked Internet site. This user determination of programming content and the merchandise options provide a higher potential interest level to all members of the selected focus demographic.

A further objective is the collection of revenue from a multitude of potential sources, including membership fees, vendor partnerships, advertising, the sale of the immediate market data derived from site user responses, sale of merchandise and services, among other possibilities.

A further objective is to provide educational services and opportunities to a selected demographic, such as teenagers. These services and opportunities include: the ability for users to collaborate educational rewards that may be acquired by meeting certain site parameters; rewards for selected demonstrations of support and help between site users and social services; and emergency help options for users who may not have acceptable access to such help services.

The present invention advantageously allows audience "viewership," typically split between media venues, to come together within a new, potent "multi-media coop," providing an enhanced interactive audience by way of a new combination of the benefits and dynamics of existing media venues, previously kept separate and distinct.

By involving an Internet site in the programming of a live television program, the opportunity for the demographic being sampled to function as the writers, or "programmers," creates a new type of entertainment program. In making products and services an element of the content that the demographic is programming, through their feedback over the Internet, members of a shared demographic can express preferences and give immediate feedback while simultaneously being entertained.

By marrying the data sampling advantages and immediacy of an Internet site with a live "television style" program, a unique venue of entertainment and "e-commerce" is created resulting in a television show and selection of marketed merchandise created entirely by feedback from the target demographic.

Participants in a theme-based Internet site directly influence, control and provide content elements of a television-style program through data they provide through the Internet. These data may include their purchasing preferences and personal opinions, private thoughts and actual video and audio transmitted by participants to the site. Further, their data is considered for potential inclusion in the linked television program.

By providing the incentives of a live game show, the human interest of a global talk show, and the commercial benefits of a "shop-at-home channel," a site geared towards a specific demographic, such as teenagers, can: 1) entertain, 2) sample data in real time, and 3) determine preferences and sell or auction these preferred products and services directly to site members.

From the home Internet participants, to the producers who steer the television production, the target demographic group decides on content, including the products and services to be sampled and evaluated and the guests to be featured.

For the time period in which the television program is not occurring live, and the site is operational, the invention provides for the creation of a unique "e-commerce" catalog. This catalog provides for ongoing content-determining interaction from the Internet audience, as well as continued selling potential. By indexing the catalog according to a variety of options, including the images and traits of guests featured within the linked television program, the invention provides for a new venue of e-commerce, cataloged according to individuals that shoppers may want to identify with, or know more about, for personal identification and taste comparison.

Further, a site constructed in accordance with the present invention preferably allows multi-level incentives, presented in an entertaining "game" form, based on collaboration between site members toward a common goal or achievement, can stimulate interactivity with the target demographic group. This allows for a unique combination of selling, entertaining, teaching and providing social and educational services, and sampling preferences quickly and accurately from a single demographic group.

Revenue can be derived from options including memberships, exclusive vendor partnerships and cross promotions, the sale of market data, advertising and the sale or auctioning of products and services (either directly from the site or by way of links to e-commerce partner sites.)

Seeing the invention as a combination of components, the "site" stage, the "program" stage, and the "catalog," the present invention contemplates the creation and maintenance of these distinct components. The interactive Internet site and the fully produced television-style program together then work to merchandize the catalog, ensuring that it is a purchasing venue of the highest possible interest to the target demographic. By combining of these components, the amplification of each component resulting from the typically separate components being interdependent and mutually promotional, is very large.

Further, questions can be posed within the context of a game show-entertainment venue allowing for the sampled demographic to provide "write in" and general preference response data immediately, which otherwise typically can only be accumulated by way of costly and cumbersome focus group studies. Focus groups studies embody the type of data which helps to track trends and changes in preferences.

Seeing the television program as a daily single hour live real time video feature on the site, for instance, site members' (participants') involvement is likely to be most intensely be focused to the time of the "program." Opportunities for simulcast of the "program" on television, cable television or other media vehicles is another special value of the "program" aspect present invention. Reciprocally, results and material from each installment of the "program" provides product options and uniquely reference material for the site during the other hours of the day, as the "catalog." Also, during the hours in which the site operates separate from the live program, members can participate in a collaborative programming process which is important in determining who from the Internet audience will become featured guests of the program.

As such, the Internet audience functions as writer and programmer of the program. Those interacting with the site might be viewing the simulcast of the program on a television monitor, and/or on a computer monitor now that technology increasingly allows for acceptable real time video viewing on computers more broadly.

In terms of electronic commerce, products and information determined by responses and feedback of site members, typically from a similar demographic group, provides a new level of interest in the items and services featured and current and future trends. Further, in displaying "preview" information and options for the upcoming episodes of the "program," participants in the site can find opportunity to accrue redeemable credit on the site in working the site options or playing the site game prior to each next "program" installment, which may serve as the climax to each day's game(s.) The potent combination of elements in this invention provide for the creation of a "cyber catalog" built directly from the appearances and preferences of site members, as featured in past live "program" segments, indexed by a myriad of options including the personalities, preferences and even the appearances of those site member "program guests."

Pages of this catalog can be indexed by both product category and actual people who have been featured in the "program." These indexed pages can include images of the site participants and video clips of these participants from their past appearance on the related "program," to allow those reviewing the catalog to reference information based on their interest in the people on which the pages are organized, allowing for new options of relating to preferences, traits and opinions of selected people of interest to catalog "readers." Transactions for merchandise can occur directly on the site, as sales and auctions, or by way of links to partner e-commerce sites.

With respect to the program, the interactive site provides: 1) the guests for the "program" (appearing visually by way of remote video feeds); 2) individual and collective feedback from site members to questions, and prompts providing added interest in others' opinions; 3) demographic information about products and options of interest for future shows; and 4) a guaranteed minimum viewership of the "program" from site participants who view the program via the Internet on their user terminal displays or via simulcast on another monitor. Further, the opportunities for further viewership from a simulcast to non-members of the site are possible, as is the potential for many of those non-Internet viewers to be drawn to participate or join the related site.

The application of the present invention for many groups who share interests of demographics is quite large. The possibility of many sites with related programs, designed to appeal to distinct groups sharing specific traits or interests, and even specially cataloged information from these programs, can exist. In each instance and for each demographic group, the key to this multimedia venue's potency lies in the level of control and content determination the Internet audience is allowed. Not unlike the editorial content of a magazine, if everything including products and services included within the program are determined or "accepted" by the interactive "producers" at home, the interest level and data sampling integrity of the venue to the selected consumers is enhanced.

Accordingly, the present invention provides a method for facilitating the exchange of data between sources in which the sources include:
 a selected interactive Internet site;
 a selected a live episodic television program;
 selected product and service providers; and
 a selected electronic commerce catalog.

The present invention also provides a marketing method for constructing a multimedia venue which elicits live response data from consumers. The marketing method provides an interactive Internet site which allows consumers to selectively affect content within a separate live television program. The live television program is produced to function in tandem with the site such that the content of the program further determines the selected content of a separate electronic commerce catalog.

Another aspect of the present invention provides a method for facilitating the exchange of data between selected sources, in which an interactive Internet site is programmed, the site including means to mutually exchange selected text, video and audio data with remote participants. A live episodic telecast is distributed, the telecast being selectively programmed to function in tandem with the site. Selected providers of products and services are coordinated, products and services from the selected providers being selectively featured within the content of the site and the production, the products and services being featured include incorporation as content bases for selected reactions from remote participants, the selected reactions including selected data solicited by the providers from the participants.

As still another aspect of the present invention, the telecast features selected data relayed from the site for inclusion therein, and provides the telecast to the site as video and audio data for selective inclusion within the content of the site. Further, the telecast is selectively distributed in at least one telecasting format, the telecasting format including streaming video transmission.

As still yet another aspect of the present invention, the streaming video transmission occurs via the Internet.

As still another aspect, the method further includes compiling an interactive Internet archive, the archive being included within the site, the archive including selected data provided from the site and the telecast.

As still yet another aspect of the present invention, the archive is catalogued and includes an index by which the participants access data within the archive using at least one option, the at least one option includes predetermined content categories pertaining to aspects of selected episodes of the telecast including selected aspects of the participants.

Another aspect of the present invention further allows participants to request the selected goods and services featured within the archive. Preferably, requested items are sold to a requesting participant in accordance with a credit-based transaction.

The present invention also provides a method for sampling demographic-specific consumer data using media venues programmed to operate cooperatively, the venues including at least one of, a selected interactive Internet site, a selected live episodic television program and a selected electronic commerce catalog, in which data are elicited from selected consumers. Consumer data are gathered. The media venues are linked thereby increasing the value of consumer demographic data to selected suppliers of goods and services to whom the sampled data is provided.

The present invention also provides a system which facilitates an exchange of demographic-specific consumer, in which the system includes a venue. At least one source is coupled to the venue, the sources including suppliers of goods and services, an electronic commerce catalog, at least one user terminal, and a live episodic television program.

An additional aspect of the present invention provides that the catalog is indexed according to variables, the variables including selected traits of selected participants of the interactive site who have been featured within the content of the program.

As still yet another aspect of the present invention, a multimedia venue is provided for facilitating the exchange of data between vendors and consumers, in which the multimedia venue includes an interactive electronic commerce Internet site and a live television program, the site and the program being interdependent for selected aspects of their respective content.

As still another aspect of the present invention, the site includes an electronic commerce catalog, the catalog being indexed in accordance with the content of the program.

As still yet another aspect of the invention, the electronic commerce catalog is indexed in accordance with traits of interactive participants of the site who have been featured within the content of the program.

As another aspect of the present invention, participants are featured visibly and audibly within the content of the program, the visible and audible feature being accomplished by way of live video and audio content transmitted to the site by terminals used by the featured participants.

The present invention also provides a system which uses a communication network to exchange data between vendors and consumers, in which there is an electronic commerce Internet catalog coupled to the communication network. An interactive electronic commerce Internet site is coupled to the communication network. A live program processor is coupled to the communication network to facilitate the production of a live episodic television program in accordance with content derived from the catalog and which is dependent on data from the site.

As still yet another aspect of the present invention, a multimedia venue for eliciting demographic specific consumer data from player terminals is provided in which the venue has an interactive Internet site and selected a live episodic television program, the site comprising a catalog database. The site and the program function in tandem to stimulate participants to use corresponding player terminals to transmit consumer data to the site. The transmitted consumer data is stored within the catalog database. The catalog database is arranged according to selected content aspects of the live episodic program.

As another aspect of the present invention, the program is selectively electronically transmitted to viewers using at least one of conventional telecasting techniques and real-time video data transmission across the communication network.

As another aspect of the present invention, a multimedia venue for eliciting data from selected consumers specific to selected demographics is provided in which there are a plurality of interactive Internet exchanges. The elicited data being used to affect the plurality of exchanges to supply data content to a separate live television program in accordance with the elicited data, the program being arranged to have a reciprocal effect on data supplied to the consumers.

As still another aspect of the present invention, the venue further comprises an electronic catalog. The content of the site and the program further determine the content of the electronic catalog.

As another aspect, the site comprises video and audio data received from the program.

The present invention also provides an Internet site for eliciting response data and real time video transmissions from selected interacting participants of said site, in which the site includes a database having a catalog arranged according to content of past episodes of the a concurrent video program and a central processing unit which determines content for a concurrent video program and content for the database.

As still yet another aspect of the present invention, a site having a data archive is provided in which elements of a produced television program are cataloged and stored in the data archive. The elements of the program are determined in accordance with interactive data provided by player terminals in communication with the site. The data archive is indexed in accordance with aspects of program, aspects including selected traits of guests of the program which include selected participants of the site.

As another aspect of the present invention, the selected traits include personality traits, opinions and physical appearances.

As still another aspect of the present invention, goods and services offered by suppliers are evaluated in accordance with the context of the site and the production, content for the site and the production being respectively determined by selected interactive participants of the site, the selected participants being members of the selected consumer demographic being sampled for the selected suppliers of goods and services.

As still another aspect of the present invention, selected participants in said interactive Internet site are featured as text respondents within the program.

As still yet another aspect of the present invention, transmitting data allows the selected participants to accrue credits, the credits having a selectively redeemable value within the site.

As another aspect of the present invention, the data provided by selected members of selected groups of the participants results in a collective effect on credit accruals of the members within the selected groups.

According to another aspect of the invention, the data provided by the selected groups results in a member of a group being rendered more likely to become a participant featured within the program.

According to yet another aspect of the invention, the selected participants interact directly with each other through at least one of messaging and chat software.

As another aspect of the present invention, the selected participants featured within the program are provided with questions. The received answers to the questions serve as the basis of selected prompts for data responses from other site participants.

According to still another aspect of the invention, the site is an electronic commerce site where selected items and services featured are offered for purchase to selected site participants at a determined or auctioned price.

According to another aspect of the invention, the site is constructed in accordance with a multi-level incentive model wherein participant advancement within a site hierarchy is possible.

According to another aspect of the invention, the model for the venue is selected from the group consisting of a societal system, a selected institution and a prison system.

According to still yet another aspect of the invention, the opportunities for interactivity include selectively referencing past data results received from site participants.

According to another aspect of the invention, the opportunities for interactivity include site supplied data prompts and participant responses based on anticipated content and options within future episodes of the program.

According to another aspect of the invention, selected participants meeting selected criteria are provided with the opportunity to receive bonuses in the form of selected free merchandise or services.

According to another aspect of the invention, selected data received from participants selectively affect bonuses and credit provided to featured participants and provided to members of groups in which said featured participants are members.

As still yet another aspect of the present invention, selected participants meeting selected criteria accrue credit by serving as guides for other members of the site who require assistance or instruction.

As another aspect of the present invention, social and educational services are made available to the participants, preferably by providing links to informational and instructional databases.

Other features and advantages of the present invention will become apparent from the following description of the invention which refers to the accompanying drawings.

Referring to FIG. 1, an example of a SITE constructed in accordance with the principles of the present invention is shown along with its page access flow, and response data flow. The SITE is represented in the overall data flow as H in FIG. 19. Its details within this Figure are as follows:

HOME PAGE—This is an interactive page within the SITE, accessible only through the log-in at the start of the Uniform Resource Locator (URL) entry. This page allows access to the CATALOG, the Help Line, the TekPak, the auctioning and product evaluation page, the LIVE SHOW subject candidate profile and questionnaire. Links to available prizes and a player's total point tally are preferably accessed via the home page, as are communication links with a player's fellow teammates and the rules to "the game."

RULES AND POINTS SYSTEM PAGE—This page is accessible to new and existing players as the key source for how to play. The RULES page is accessible from a variety of areas and spells out the do's and don'ts of system usage as well as preferably encompassing a video warning on the obvious issues around "Chat" and maintaining anonymity. There is a stipulation on the points structure as well as how players are combined into groups, for example, 12 player blocks, and that working together as a team will benefit the block as a whole. The role of the "host" is defined, as well as any other hierarchy positions within "the game." The general rules of play and operation are presented at this page.

LOG-IN—is the first page a new or returning player encounters when they attempt to access the SITE. The player enters either an existing player name and password or requests processing through the player registration form as a new player. Access to SITE pages is limited outside of the log in. Players/visitors can go to the Help page/site (but not the full Help Page within the site for security reasons). New and returning players can go to the rules page, which is at the topmost level of the site, so they can learn how to play. Preferably, there is also a "forget your password?" link. This page is where a player logs their first real data to create a profile that is entered into a database which is engineered to capture information corresponding to the demographic to which "the game" is being applied. This page is identified by the letter H, shown in on FIG. 19.

LEGAL & DISCLAIMERS—This page is the default link page to any new player applicant. A player cannot access the Home Page without reviewing this document. It contains legal information indemnifying the Producers of "the game." Within this page, there are consent and release forms, agreements, a parental credit block, and product manufacturer credits. There is preferably a Rules page link for easy navigation/reference. Preferably there is also a Chat Room stipulator (this may appear in the Rules page, as well as the Chat link within the Home Page). Pages describing various agreements, releases, applications for credit, parental "Shopblock," etc. As a new entrant is filling out the registration they must go through the legal document before entering the site. However, set up of the legal document as a game would add interest to the tedious nature of the reading the legal information. Making it fun or quiz-like provides evidence of verification that the player has read it. The player can be rewarded with their first points for applying themselves. Password fields do not allow a player to pass to the next SITE area until all are filled out.

CREDIT CARD APPLICATION—This is the main credit card application page which can either act as a self-contained page with an application that, once filled out, will be forwarded to credit card partner, or be a direct link to the credit card partner's on-line entry. There can be a link to the Rules page as well as the Legal page. Preferably there is a clear stipulation that purchases from within the game's CATALOG require credit or debit card, or parental credit card information. There should also be clear stipulation that abuse of the card within the site (i.e. non-payment) may be punishable with points lost. Successful application for credit can be rewarded with membership, or some other privilege, or, an approved card application gives an automatic membership to some of the more exclusive areas within the SITE. At any point in time that a user wants to buy membership with points, they are warned that auctioning requires purchase with credit card. They are then forwarded to credit application/enrollment where the credit card information is taken (either parents card or other card.).

Figure 19:
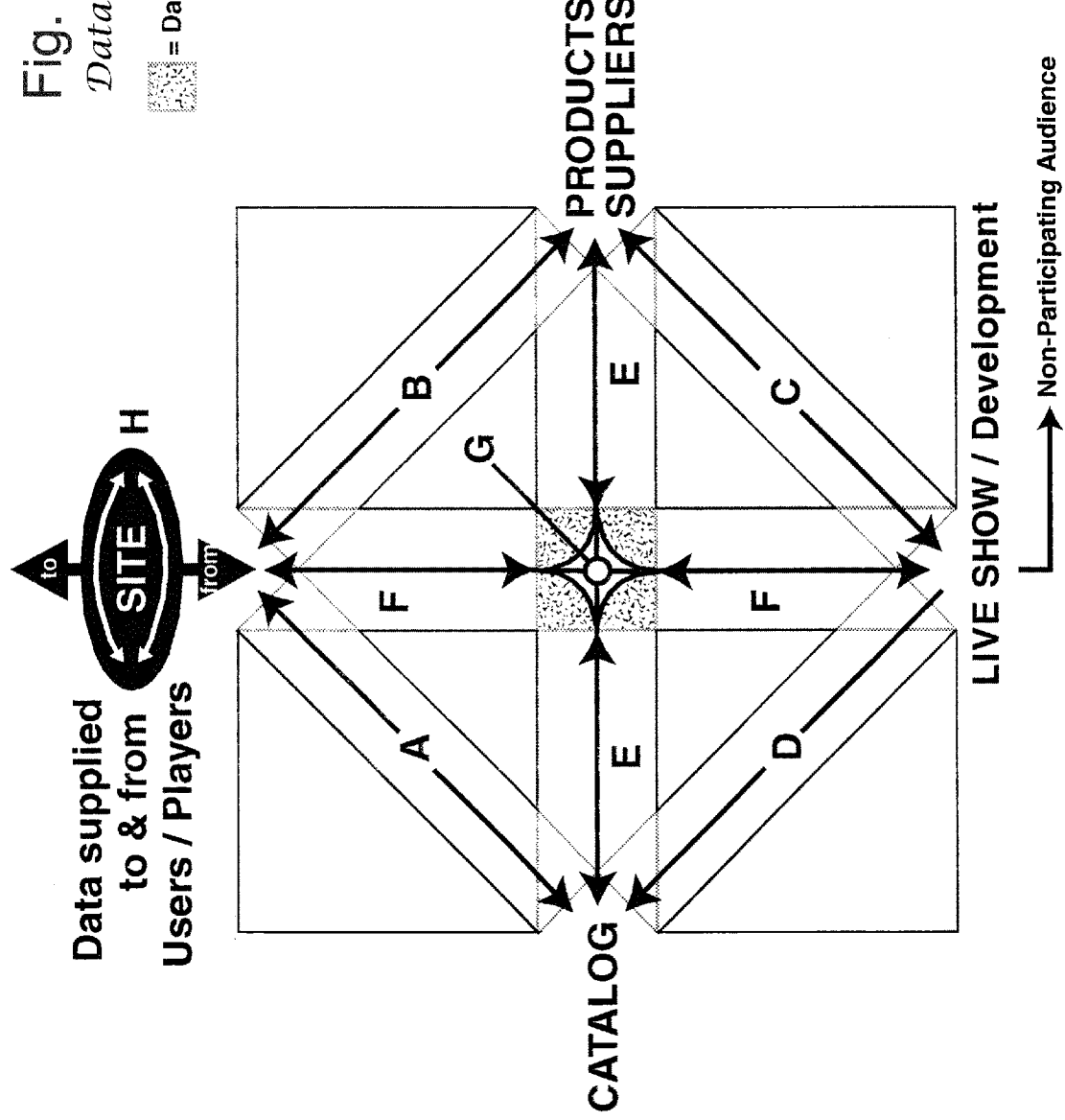
FIG. 19 is a diagram showing examples of data flows according to the present invention.

CATALOG—The catalog section is the primary source of player e-commerce and archiving of data input within "the game." Although the CATALOG is a component of the SITE, the catalog section data flow is represented in FIG. 19 independently because it is a concentration of data traveling to and from On-Line Players within the SITE, PRODUCTS/SUPPLIERS, and the LIVE SHOW/Development. The catalog section accessible from the Main Page or "home page" and broken into several catalog areas with two key areas creating distinct sections separated by product of past LIVE SHOW Subject Player profiles and by product category. There can be links to product sponsors, pull-down menus for product searches by trait or characteristic, and sections divided into areas showing what was accepted above 50% of the vote by on-line players and what was not. For instance, products and services offered are weeded out by on-line player voting to show what is preferable by majority, but products and services not selected by majority are available for review in a separate products/services area. All products/services shown within the SITE and CATALOG are selected by the producers in tandem with on-line players product voting and evaluation which occurs within the LIVE SHOW Subject Player profile/questionnaire and the auction/merchandise evaluation form. Products/services within the CATALOG can be purchased by players with a credit card, points alone, or a combination of the two. Credit Card/Cash purchases of product within the CATALOG accrue points for the player by a percentage of the total dollars spent.

LIVE SHOW Subject Player Profile/Questionnaire

This is the main interface page for the entry of player feedback during the time, for example the 23 hours, prior to the LIVE SHOW segment. Questions are posted and answered by players as to what they believe will be LIVE SHOW Subject Player's responses during the LIVE SHOW, as well as what they believe would be suitable for the Subject Player, and even themselves. Here, on-line players can access questionnaire responses by their fellow teammates and communicate with them by on-line e-mail or "chat." The questionnaire will be a mix of entertainment-oriented and merchandise-oriented questions. There will be "surprise" questions that will be asked during the live segment and award special points as an incentive for players to "tune in." Write-in boxes for additional feedback/dialogue are available to on-line players for additional points. This area of the site is where most of the interactivity occurs. It is preferably be a main page during the majority of the live segment of "the game." Here, on-line players may experience being brought on-air unexpectedly by way of the TekPak (see FIG. 19). Marketing feedback on products/services as they are evaluated by players can be a button-process in descending order with "hip-phrase" description of acceptance, i.e. "Excellent!," "Cool," "It Rocks," "It Bites," "Bogus," etc. The descending order will be the products/services evaluation. "Excellent"=Very High, "Cool"=High, "Bogus"=Poor, etc. This makes for easy voting & tabulation. An additional text dialogue could be supplied, with 20 characters for example, for suggestions of alternate answers not supplied in the choices available or elaboration that could be databased by keywords.

QUESTIONS & MERCHANDISING INPUT—These are the general trivia questions, product questions, suppositional scenarios, and spontaneous LIVE SHOW questions that on-line players answer during their respective on and off-air segments of "the game." This data is delivered to an informational repository for collating and evaluation during the LIVE SHOW, as well as by suppliers of GOODS AND SERVICES (see FIG. 19).

AUCTIONING & MERCHANDISING FORM—This page is the primary evaluation/voting section on products to be utilized at later dates or subsequent LIVE SHOWS within the LIVE SHOW Subject Player profile/questionnaire and a major source for player interaction/participation for points. It is also the live auction section of the site where SUPPLIERS OF GOODS AND SERVICES might supply a requisite amount of goods and services in exchange for the data that may come with their products posting within this page. Players are able to buy these special products/services in auction at wholesale to retail prices with cash (credit card), cash-points, and points only. This page is a major source of consumer data for suppliers of GOODS AND SERVICES (see FIG. 19). On-line players are rewarded with merchandising points for supplying valid product evaluations. Some auctions may involve exclusive membership to access specific areas for auction unavailable to "non-members." This might be special product, or products/services at a "members only price." These memberships can be acquired through redemption of points, credit card purchase, and as a reward for certain participation within "the game" (i.e. New player applies for credit card through Credit Card application within SITE and receives approval. This player could receive instant membership).

TekPak—The Tek Pak Page is preferably accessible from a variety of pages within the site. It is an information/order form for this mini-video cam that is easily installed and an excellent cross-collaborative component of "the game." It allows the ability to be seen remotely via a standard dial-up modem and allow video conferencing capability. The TekPak manufacturer can supply to on-line players who attain the position of LIVE SHOW Subject Player and allocate quantities that can be sold directly through the manufacturer or its distribution center. The Tek Pak the primary mode of communication with a LIVE SHOW Subject Player and any on-line players who are brought unexpectedly on-air during the live show, preferably one hour long. Tek Paks can be purchased through this page or be made into a membership incentive. For instance, players with special membership can get a special rate on Tek Paks, etc.

HELP LINE—This page is the link to a separate demographic specific, i.e., "help" center, for example, a teen "help" center. It is the connection to a forum for issues, information, chat and other support for teens. Within the site are on-line psychology support or links, educational references, drug rehab links, college profiles, student loan program links, scholarship program links, sexual and family planning, etc. This can also be where on-line help for "the game" may exist. An on-line player of particular rank or LIVE SHOW Subject Player is be on-line to aid in oriented or helping new players in getting oriented with rules and strategies of "the game."

Figure 18:
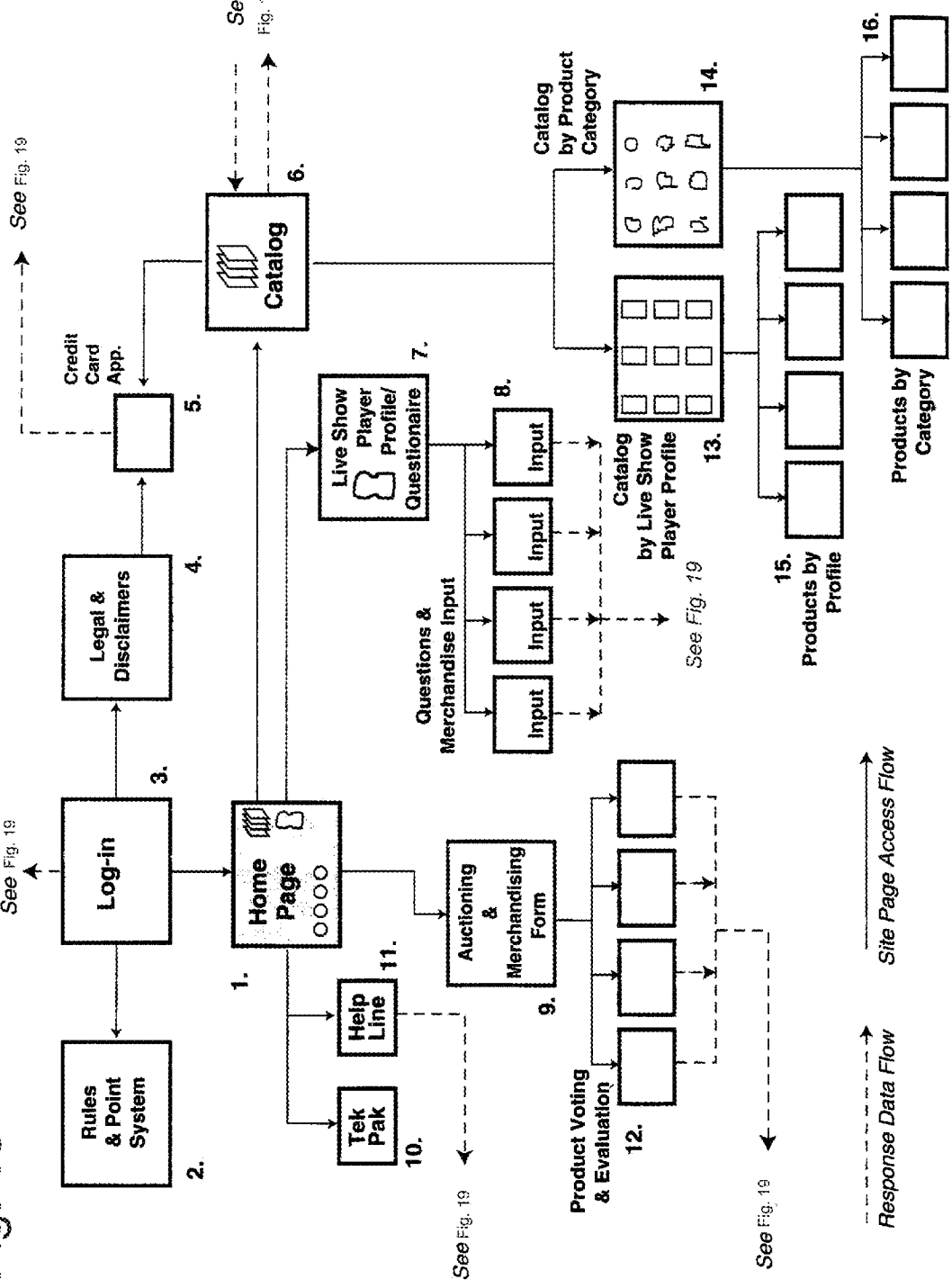
FIG. 18 is a block diagram of an example web site showing access and response data flows in accordance with the present invention.

PRODUCT VOTING AND EVALUATION—This is where individual products and services are accessed and voted upon within the Auctioning & Merchandising page (#9 on FIG. 18). This information is collated from on-line player responses in exchange for merchandising points and subsequently databased and evaluated by the Teen Producers as potential products and services to be featured in later LIVE SHOWS. This information is also data gathered for use by suppliers of GOODS and SERVICES to gain incite on the viability of their products or services within the applied demographic (see FIG. 19).

CATALOG BY LIVE SHOW PLAYER PROFILE—This page is one of two preferred formats in which products are required within the CATALOG, the other being by product category (#14 on FIG. 18). Here, players can review products which have been selected by them, the LIVE SHOW Subject Player, and the Producers of the LIVE SHOW during all 24 hours of the on and off-air segments of "the game." It is truly the culmination of consumer-approved products/services collated into an e-commerce CATALOG by specific consumer traits/profiles, all of which were determined through the process of players participating in the SITE and the LIVE SHOW (see FIG. 19). As LIVE SHOW Subject Players participate in the on-air segment of "the game," their personality profile is evaluated and products/services are voted on by players as to what products/services may actually be most appealing or best suited for the Subject Player. Outcomes are established within this segment of the CATALOG and preferably posted where on-line players can shop products/services based on traits of personality, fashion, music, talents, interests, and others. Purchases are by way of credit card, points redemption, or a combination of the two.

CATALOG BY PRODUCT/SERVICE CATEGORY— This page is one of two formats in which to review products and services within the CATALOG, the other being by LIVE SHOW player profile (#13 on FIG. 18). Here, players can review products and services that have been determined by them, the LIVE SHOW Subject Player, and the Teen Producers of the LIVE SHOW during all 24 hours of the on and off-air segments of "the game." These products and services have proven viability and high appeal toward their demographic due to the method in which they were selected. This method being the determination of these products/services appeal through the participation of the SITE and the LIVE SHOW (see FIG. 19).

PRODUCTS/SERVICES BY PROFILE—These pages are the individual product pages showing past LIVE SHOW Subject Players and their profiles, their profile video and all products/services that were selected by them for themselves, the on-line players selection for the Subject Player, and the percentage of acceptability. Products/services can also be searched by traits/characteristics.

PRODUCTS/SERVICES BY CATEGORY—These pages are the individual product pages showing product by category, and the corresponding percentage of acceptability. Products and services can be queried by a variety of categories such as the type of product or service it is, manufacturer, season, price, sport, fashion, accessory, clothing, technology/electronics, music, entertainment, and many other categories.

FIG. 19 is a diagram showing examples of data flows implemented by the present invention. Referring to FIG. 19, the data flow has clear avenues between each junction point and convergence at the center. The data flows shown in FIG. 19 are described as follows:

A—Data Flow Between SITE and CATALOG.

Represents the primary avenue of e-commerce and consumer financial transactions as well as the archive of user-defined and sanctioned products and services as resulting from the interaction between the SITE and the LIVE SHOW.

B—Data Flow Between SITE and PRODUCTS/SUPPLIERS

Represents the to-and-from flow for data to user profiles for vendors by way of credit card partners and the SITE information, TEK PAK hardware vendor, Help Line (#11 in FIG. 18) services, on-line advertising, requests for advertising/celebrity endorsed product, and any product feature/evaluation by On-Line Players, data responses on products featured in auctioning or product evaluation.

C—Data Flow Between LIVE SHOW and PRODUCTS/SUPPLIERS

Represents to-and-from data gathered and distributed for products/services endorsements, live consumer feedback on products/services as a mass-market focus group, live celebrity endorsements, and approval/denial for endorsement/evaluation from Teen Producers and LIVE SHOW Development in conjunction with data response from On-Line Players at the SITE (Figure B).

D—Data Flow Between CATALOG and LIVE SHOW

Represents the one way flow of data from the LIVE SHOW to the CATALOG for the archiving of user-defined and sanctioned products and services as resulting from the interaction between the On-Line Players within the SITE, PRODUCTS/SUPPLIERS and the LIVE SHOW.

E—Data Flow Between CATALOG and PRODUCTS/SUPPLIERS

This flow represents the data gathered within the CATALOG from the SITE to render a viable list of products and services of which have a verifiable level of acceptance by the applied demographic. PRODUCTS/SUPPLIERS informed with this data subsequently responded easily by merchandising product or fulfilling services in demand as the data dictates.

F—Data Flow Between SITE and LIVE SHOW

This is the data exchanged to and from the tandem operation of On-Line Player responses to questions within the SITE and their interplay/verification within the content of the LIVE SHOW. On-Line Players furnish data, either by way of entry within the SITE or "chime-in" via TEK PAK in exchange for rewards in the form of merchandising points towards GOODS AND SERVICES and other incentives.

G—Data Flow Convergence of all Data Flow Avenues

The convergence point G serves as an information catalyst and point of translation for data transfer. Within point G, data is exchanged between the various entities cooperating within the present system. Point G dictates the format, configuration, and any other content parameters of the separate elements of the LIVE SHOW, SITE, CATALOG, and opportunities for PRODUCTS/SUPPLIERS, allowing them to operate in tandem to elicit data from the consumers. Point G is implemented using a multimedia software "language" or system which coordinates the communication between all separate and outside multimedia to work in a cooperative manner to achieve a specific function. This aspect will be described in greater detail below.

H—Data Supplied/Entered and Accessed by Users/Players

This is the primary source of all data with "the game." The data flow within H represents all information supplied by On-Line Users/Players (illustrated by "from" of H) from initial LOG-IN (#3 of FIG. 18) to all data entered thereafter. Player profiles, questionnaires, team vote for Subject Player Candidates, or other relevant date is shared within "team members" and returned to Users/Players at their request (illustrated by "to" of H). This is also where e-chat among On-Line Players occurs.

Figure 20:
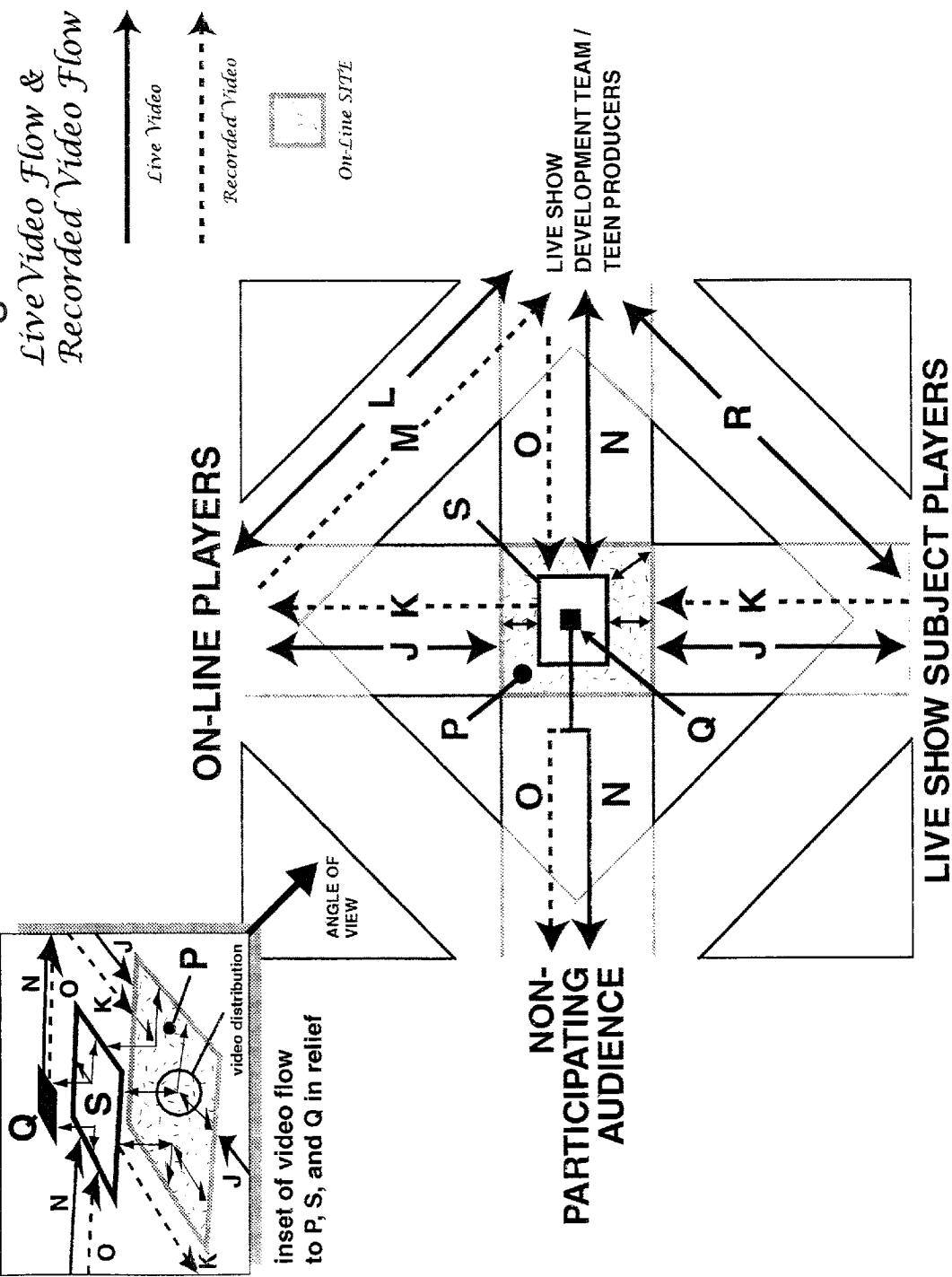
FIG. 20 is a diagram of live and recorded video data flows.

FIG. 20 is a diagram of live and recorded video data flows of the suggested flow of live and recorded video between the On-Line Players, the LIVE SHOW Subject Players, the Non-Participating Audience, and the Producers/Development Team of "the game." As shown in FIG. 20, the data flow has clear avenues between each key junction point illustrating the video flow, all of which converge to create what becomes "the game." It should be noted that along with Non-Participating Audience, the On-Line Players may access the LIVE SHOW content by way of conventional television transmission and play the on-line SITE content in tandem via the Internet.

J—Live, Two-Way Video Transmission from on-Line Players to SITE and LIVE SHOW Subject Player.

This flow is presented in the format of spontaneous on-line player on-air video appearance or "chime-in." Conversely, LIVE SHOW Subject Players transmit live video as on-air participants of the LIVE SHOW.

K—One-Way Recorded Video Transmission from LIVE SHOW Subject Players to SITE and on-Line Players This flow is presented in the format of profile video reviewed by On-Line Players during the off-air SITE.

L—Two-Way Live Video Transmission from on-Line Players to LIVE SHOW Teen Producers This flow is presented in the form of spontaneous on-air video appearance or "chime-in" by the On-Line Player and conversely from Teen Producers to On-Line Players in the form of LIVE SHOW host, celebrity appearances, product endorsements, and any other LIVE SHOW content that requires live, real-time presentation or response.

M—One-Way Recorded Video Submission from on-Line Players to Teen Producers

This flow is presented in the form of LIVE SHOW Subject Player submission profile video, conversely reviewed by Teen Producers and used as content during the on-air LIVE SHOW and off-air SITE.

N—One-Way Live Video Transmission of LIVE SHOW Content to Non-Participating Audience and on-Line Players Via Television Broadcast or Other This flow is presented in the format of all LIVE SHOW content outside of LIVE SHOW Subject Players and on-line player "chime-in," namely LIVE SHOW host, celebrity appearances, product endorsements, and any other content that requires live, real-time presentation or response.

One-Way Recorded Video Transmission of LIVE SHOW Content to Non-Participating Audience, LIVE SHOW Subject Players, and on-Line Players via Television Broadcast or Other.

This flow is presented including LIVE SHOW Subject Player profile videos, product video, music videos, and hypothetical question video presented as LIVE SHOW content.

P—Representative of Information Vehicle and Convergence Referenced Throughout the Embodiment as SITE The key point of interactivity outside of the LIVE SHOW, the SITE is the receptacle and distribution point for incoming and outgoing live and recorded video to various areas of "the game." (See Inset in FIG. 20).

Q—One-Way Live Video Transmission to Non-Participating Audience.

This transmission is for those who do not take part in the interactive component of "the game" but wish to watch as it takes place. The transmission is preferably supplied by conventional television signal, cable access digital broadcast satellite (DBS), and the like. The same access would supply On-line Players live television transmission to interact in tandem with the SITE, if this were the preferred format of "the game." (See Inset in FIG. 20).

R—Two-Way Live Video Transmission from Producers to LIVE SHOW Subject Players

This would essentially be TEK PAK two-way integrity testing in preparation for LIVE SHOW broadcasting.

S—This is the Convergence Point of all Live and Recorded Video Transmissions.

Figure 21:
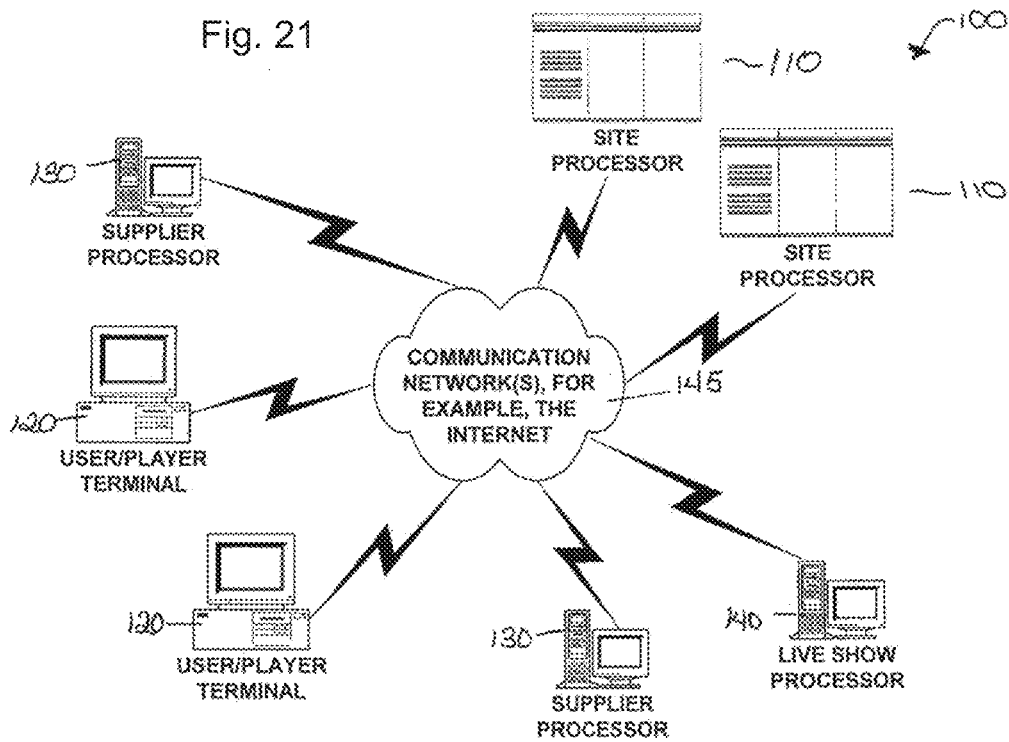
FIG. 21 is a diagram showing an example of a hardware arrangement of an interactive network-based marketing system of the present invention.

It is referenced throughout the embodiment as the LIVE SHOW. (See Inset in FIG. 20), Referring now to FIG. 21, that Figure is a diagram of an example of the hardware components of a network based marketing system constructed in accordance with the principles of the present invention. Marketing system 100 is preferably comprised of one or more site processors 110, one or more user/player terminals 120, one or more supplier processors 130, one or more LIVE SHOW processors 140 coupled together through communication network 145.

Although shown as a single communication network, communication network 145 can be comprised of multiple interconnected networks, for example the Internet. As such, communication network 145 can be any communication network, but is typically the Internet or some other global computer network. Communications between the elements of marketing system 100 can be implemented using any known arrangements for accessing communication network 145, such as dial-up serial line interface protocol/point-to-point protocol (SLIP/PPP), Integrated Services Digital Network (ISDN), dedicated leased-line services, broadband (cable) access, frame relay, Digital Subscriber Line (DSL), asynchronous transfer mode (ATM) or other access techniques.

User/Player terminals 120 have the ability to send and receive data across communication network 145, and the ability to display the received data on a display device using appropriate communication software such as an Internet web browser. By way of example, terminal 120 may be a personal computer such as an INTEL PENTIUM-based computer or an APPLE MACINTOSH computer, but is not limited to such. Other such terminals which can communicate using a global computer network such as palm top computers, personal digital assistants (PDAs) and mass-marketed Internet access devices, i.e., WEB TV, can be used.

Accordingly to the present invention, user/player terminals 120 provide access to supplier processor 130, site processor 110 and LIVE SHOW processor 140 for the purpose of accessing the above-described functionality relating to the game, catalog, auctioning and other aspects of the present invention.

System software which controls the above-described functions relies primarily on one or more site processors 110. Site processors 110 typically communicate with network 145 across a permanent i.e., unswitched, communication link. Permanent connectivity ensures that access to server 110 is always available to terminals 120, supplier processors 130 and LIVE SHOW processors 140.

Site processors 110 can be any appropriately sized computing platform, the storage, processing and other functional capacities of which are determined based on expected user activity and data storage requirements. For example, site processors 110 can be server-type personal computers, mini-computers such as UNIX-based servers, and even mainframe computers.

Supply processors 130 are preferably owned and maintained by the entities of supplying goods and services for marketing. Supply processors 130 are preferably used for receiving demographics, marketing and sales data from site processors 110 and for providing corporate, product and service and other relevant information to site processors 110, terminals 120 and LIVE SHOW processors 140. Further, orders for goods and services placed by users via user/player terminal 120 can be accepted directly from user/player terminals 120 or via site processors 110 (in the case where users placed orders via site processors 110).

LIVE SHOW processors 140 are typically located at the production facility for the LIVE SHOW and are used to facilitate the broadcast and transmission of the LIVE SHOW. For example, LIVE SHOW processor 140 can receive data from a site processor 110 via communication network 145 and can also be used to provide instructions to site processor 110 regarding questions, demographic data and to receive responses from on-line players. In other words, aspects of the LIVE SHOW which require communication with the other elements of system 100 can be implemented on LIVE SHOW processor 140. In addition, where the LIVE SHOW is being broadcast via cable, DBS or traditional broadcast television methods, additional equipment (not shown) known in the art of television production is incorporated within system 100. This equipment includes, television cameras, production equipment, communication links, etc.

Figure 22:
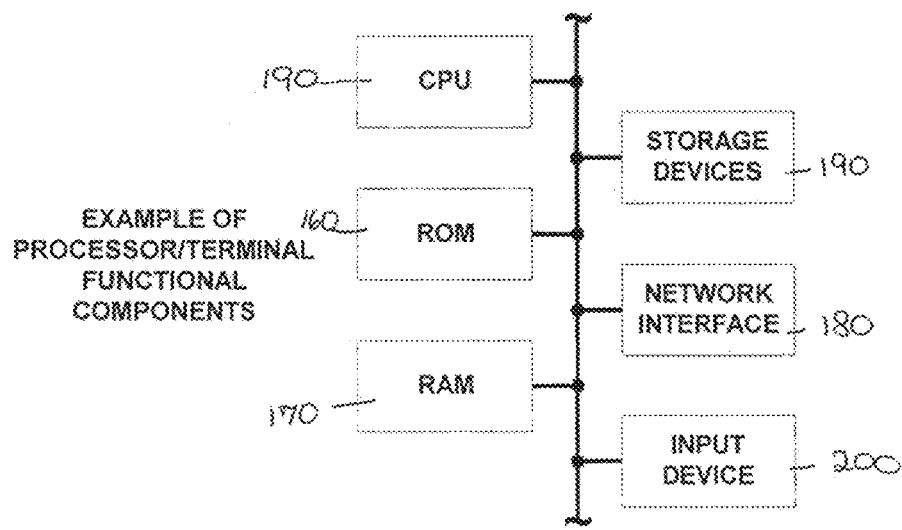
FIG. 22 is a block diagram of the functional elements of the SITE processor of the present invention.

As shown in FIG. 22, the functional elements of each site processor 110 preferably include a central processing unit (CPU) 150 used to execute software code in order to control the operation of the server, read only memory (ROM) 160, random access memory (RAM) 170, at least one network interface 180 to transmit and receive data to and from other computer devices across communication network 145, storage devices 190 such as a hard disk drive, floppy disk drive, tape drive, CD-ROM, DVD-ROM and the like for storing program code, databases and application data, and one or more input devices 100, such as a keyboard and mouse.

The various components of site processor 110 need not be physically contained within the same chassis or even be located in a single location. For example, the database on storage device 190 may be located at a site which is remote from the remaining elements of site processor 110, and may even be connected to CPU 150 across communication network 145 via network interface 180.

Terminals 120, supply processors 130 and LIVE SHOW processor 140 are preferably comprised of the same or subset of the functional components described with respect said processors 110. Of course, the functional components of these devices are sized to accommodate capacities appropriate for their usage. For example, terminals 120 may include more sophisticated displays and display driving hardware than the other elements, but may contain a smaller storage device, and less powerful CPU 150 than the other components. Also, supplier processor 130 may contain a more powerful CPU 150 than site processor 110, especially in the case where supplier processor 130 is implemented by a large corporation with a sophisticated Internet presence. Also, the above-described TekPak are typically attached to a known interface on user/player terminal 120 (not shown), for example a serial port, parallel port or universal serial bus (USB) port.

The nature of the invention is such that one skilled in the art of writing computer executable code (software), will be able to implement the described functions using one or a combination of popular computer programming languages such as "C++," Visual Basic, Java or HTML and/or web application development environments. As discussed above, one of the functions performed by said processors 110 is that of operating as a "web site."

A web site typically communicates with web browsers using the hypertext transfer protocol (HTTP) to send and receive data including hypertext mark-up language (HTML) web page data and executable JAVA Applets. Of course, any known data transfer protocol and web site configuration/definition language can be used to implement the system 100.

As described herein, references to displaying data on user/player terminal 120 refers to the process of communicating data to the terminal across communication network 145, and processing the data such that the data can be viewed on the terminals of screen using Internet web browser software. Although the present invention is described by way of example herein in terms of a web based system using web browsers and a site processor 110, system 100 is not limited to that particular configuration. It is contemplated that system 100 can be arranged such that terminals 120 can communicate with, and display data received from, the other elements of system 100 using any known communication and display method, for example, using a non-Internet browser WINDOWS viewer coupled with local area network protocol such as Internetwork Packet Exchange (IPX).

Referring now to the above-described Figures, the following is a general description of the present invention and the involvement of an interactive SITE, a live episodic television program or LIVE SHOW (as it will be referred to in this preferred embodiment,) and how the flow of data (as shown in FIG. 19) converges during participants' interaction with the SITE and the SHOW, providing new data exchanged between providers of PRODUCTS AND SERVICES and selected consumers (as referenced by point G in FIG. 19).

The accompanying illustration (FIG. 19) demonstrates the new pathways of data formed by way of the present invention to create a new marketing "intersection" of information. Further, a portion of the data demonstrated is directly elicited by aspects of the present invention; specific data that might not otherwise have been compiled. FIG. 19 illustrates the method of converging data from separate and outside sources in a structured process to establish a common understanding between these variables to work congruently to access demographic specific data.

The method of the present invention is described from the point of a new participant or "player" registering after encountering knowledge of the ability to interact within the vehicle of the invention, heretofore referred to as "the game," either through conventional promotion or existing player "recruitment."

The indicated SITE as shown by H of FIG. 19 and FIG. 20 that the player accesses is an entertainment/e-commerce/communication vehicle which rewards player participation with merchandising points that can be redeemed within the SITE through an on-line CATALOG of player-determined PRODUCTS AND SERVICES.

The player enters the registered URL address of the SITE, for example, and encounters a log-in page (#3 of FIG. 18) where entry is accessible as a new member only through the registration of specific information. This information enables the building of a user "profile" which can be placed into a profile "repository" (This data contact is illustrated by H of FIG. 19). The new player completes response fields that relate to legal disclaimers (#4 of FIG. 18) and rules of the site (#2 of FIG. 18). Preferably, these fields will not advance to a subsequent field without completely filling out the requested information, but offer rewards in the form of merchandise points as they are completed. Returning players simply log in using their registered player name and password at the log-in page, allowing them to advance to the primary SITE page.

Upon successful completion of the entry form and review of the rules and legal disclaimers, new players are assigned to a block having a predetermined number of players, preferably twelve players. It should be noted that some of these players may have been recruited by other members. Registered players meeting site participant performance requirements may recruit new members and are subsequently rewarded with merchandising points for their successful recruitment efforts. These players preferably have communication capability with each other by way of e-chat 24 hours a day and are only able to access relative profile information that would not divulge irrelevant identity/personal information. As "team members" they are encouraged to interact through e-mail and supposition through each other's profiles (within H of FIG. 19) and questionnaire responses (#7 of FIG. 18). On-Line Players preferably receive merchandising points for profiles reviewed. These team members, through interaction and collaboration, select a member amongst themselves to be proposed as a LIVE SHOW Subject Player candidate and possibly rewarded with merchandising points for their collaborative effort. This player, if selected, will vie for points and prizes for himself and his team members. The intent is to foster a teamwork mentality and encourage these players to help each other to achieve a common goal, which is the ascension of rank and status within the structure of "the game."

Ascending ranks are attained by amassing points achieved by participating in "the game," recruiting and aiding players, purchasing products, and other methods which revolve around participant collaboration and selected site participation. As players begin at the lowest level, various levels of ascension through accumulation of points preferably brings special privileges. Examples of these privileges include (1) access to special auctions; (2) special discount programs for merchandise; (3) exclusive memberships to areas of the site which are reserved for "members only"; (4) permission to submit a profile video for consideration as a LIVE SHOW Subject Player, meaning those who become featured personalities of the show segments (video submission being avenue M of FIG. 20); and (5) unannounced inclusion in the LIVE SHOW, among other options. This video is reviewed by the Producers of the show and, if selected, is posted within the LIVE SHOW Subject Player questionnaire on the SITE (#7 of FIG. 18) for review by On-Line Players (avenue K of FIG. 20). The video helps On-Line Players get a sense of the LIVE SHOW selected Subject Players and the opportunity to respond to the questions designed for that Subject Player (avenue J of FIG. 20).

Registered players at the highest levels are preferably considered to co-host a LIVE SHOW broadcast or become a "Producer" and actually help in the development and production of "the game." It is important to note that the target demographic that the present invention strives to reach and sample is involved in all aspects of producing the LIVE SHOW multimedia venue.

The points system within "the game" rewards players for their participation, input, incentive, purchases, positive feedback, entertaining responses, help with other players, and recruitment of new players. Points for purchases can be issued in accordance with the site providers' reference, but is preferably a percentage of the overall currency, i.e., dollar purchase. For example a $100 purchase could yield a 10-point reward.

"The game" is designed to have merchandising elements of a high appeal within the applied demographic within it. As such, players are preferably encouraged to access a credit card application (#5 of FIG. 18), preferably within the log-in page. This credit card, available through an established credit card partner, can be secured either through standard verification of players credit records, or through parent sanctioning through co-signing (this data is a component of B in FIG. 19). With a parental co-sign, the option for a CATALOG "shop-block" can be exercised to curtail the buying privileges of the player for whom the parents had co-signed. The credit card promotion demonstrates one of the powerful vendor partnership potentials within the site allowing for a focused promotion between the target demographic and a credit provider.

Upon advancing to the primary SITE page (#1 of FIG. 18), players have access to the core elements of the LIVE SHOW (conduit F on FIG. 19), the SITE, and the CATALOG (conduit D on FIG. 19). Players are essentially at the interactive starting point component, designated as SITE in FIG. 19. Available at this location are pages to order a video hardware component, heretofore referred to as the TekPak, (#10 of FIG. 18 and avenue B of FIG. 19) that allows the possibility of players to experience live, network-driven, two-way, real-time video interaction with the LIVE SHOW itself (avenue J of FIG. 20).

The TekPak aspect of the present invention demonstrates yet another important vendor-partnership potential within the SITE and as an aspect of the invention, allowing for a valuable technology partner relationship by providing "site-show" compatible hardware to site participants desiring to interact visually within the multimedia venue of this invention.

As described above, the present invention also provides access to a personal Help-Line (#11 of FIG. 18), a link to the LIVE SHOW (by way of conduit F on FIG. 19 and as controlled by Producers derived from the ranks of past site participants) and a profile-driven CATALOG of merchandise (#13 of FIG. 18 and information flow illustrated by way of conduits A and D on FIG. 19). Within the aforementioned Help-Line, players can seek out and arrange for educational services, career counseling, drug and alcohol rehabilitation centers, sexual and pregnancy counseling, college information links and databases, and other emergency help options for players who may not have acceptable access to these services.

In terms of a 24-hour day and supposing a daily one-hour show, players have 23 hours of access to questions and profile video within the SITE relating to the content of the upcoming one-hour LIVE SHOW segment (component of Flows F, B, and C on FIG. 19 and Flows K of FIG. 19). These questions/ video reside and are responded to on the LIVE SHOW candidate participant page (#7 of FIG. 18). The LIVE SHOW segment will feature two Subject Players, or LIVE SHOW players, who have been elevated to, a level within "the game" such that that they are eligible for substantial rewards, barring the interactive outcome between the LIVE SHOW and participating On-Line Players (avenue F of FIG. 19). These particular Subject Players have earned the opportunity to appear on the LIVE SHOW as the result of several circumstances: 1) they may have earned a requisite quantity of points through participation in the SITE; 2) they may have been notable in the recruitment of additional players to "the game"; and 3) they may have been elected by their peers to represent them on the LIVE SHOW (an activity occurring within H of FIG. 19). With the advent of these circumstances, a potential LIVE SHOW Subject Player candidate is notified by the deciding Producers of the LIVE SHOW that they may submit a video for consideration to participate in the LIVE SHOW (avenue M of FIG. 20). If the Subject Player candidate's video is selected, they are then notified that they will participate remotely via live video through the aforementioned interactive video camera (TekPak) for the potential of substantial prizes (flow F of FIG. 19 and flow J of FIG. 20). Naturally, in the example of a teen-based game, a business framework of adult executive producers would create the environment for the teens to create and "program" the LIVE SHOW, though the teens would be regarded as the "editors" (not unlike a magazine which may have its editorial staff and its business and operations staff, often referred to as the publishing staff).

The SITE is configured to work in tandem with the production of the LIVE SHOW and is designed to solicit and reward responses from participating On-Line Players which will be addressed during the content of the LIVE SHOW (avenue F of FIG. 19). Some of the questions are engineered for their value in evaluating products and services that the Producers have selected for inclusion in the programming for a host of SUPPLIERS OF GOODS AND SERVICES who have "requests for consideration" into the show (avenue B of FIG. 19).

The present invention is preferably arranged such that On-Line Players can vote on what commercials may actually be aired during the LIVE SHOW through viewing the commercial video residing on the SITE (avenue K of FIG. 20 and aspects of avenues F, E, and C of FIG. 19) adding further product evaluation to SUPPLIERS OF GOODS AND SERVICES. On-Line Players have the possibility of being rewarded merchandise points, should that player's responses have a favorable result relative to the outcome of the LIVE SHOW segment. Preferably, LIVE SHOW players have even greater prizes to attain if they achieve a favorable outcome during the LIVE SHOW.

During the remaining, i.e., 23, hours of "off-air" time prior to the LIVE SHOW, participating On-Line Players preferably answer multiple choice questions of an entertaining nature directly relating to the LIVE SHOW Subject Players and other content (#7 of FIG. 18). Players can also respond in data fields capable of accepting and recognizing key words that can be easily sifted for storage in a database. These questions are engineered to elicit information that would then be collated and stored in a database as response information relating at times directly to products and services. Subsequently, a viable products/services list is returned for display within the on-line CATALOG or subsequent LIVE SHOWS (avenues C and E of FIG. 19). It also serves as viable data to SUPPLIERS OF GOODS AND SERVICES, as the product data gathered is directly selected by the members of the given demographic resulting in immediate verification of the high levels of acceptance by that demographic (avenue E of FIG. 19).

The CATALOG integrity gains an advantage due to the existence of the site data, ensuring that the feedback on items featured within the CATALOG creates further potential interest in the selected items featured by the purchasing demographic (Flow A of FIG. 19).

On-Line Players may peruse or browse this on-line CATALOG in several manners including product by Category or as product by LIVE SHOW Player Profile (flow A of FIG. 19). All products are essentially items that have been reviewed by both On-Line Players and LIVE SHOW Subject Players and selected by popular vote through responses gathered within the LIVE SHOW Player Profile Page (#7 on FIG. 18) and revealed during the LIVE SHOW (Flow F of FIG. 19). These catalog pages may include visuals and/or actual video of the selected player on which referenced pages are indexed, as well as selected "reply" show content from the LIVE SHOW segment in which the player appeared.

Data supplied by players at the SITE level are stored in the database and confirmed during the LIVE SHOW (flow F of FIG. 19) and subsequently applied into a verifiably "consumer approved" on-line CATALOG. This CATALOG can be reference/queried by product category or personality traits/ profile, or other variables specific to occurrences within the corresponding LIVE SHOW segment (flow D of FIG. 19). Any purchases or financial transactions of items within the CATALOG are preferably accomplished either by credit card, redemption of site merchandising points, or a selective combination of the two (flow A of FIG. 19). Players with special privilege memberships may have access to products or discounts not available to players outside of the membership or may have early notice of goods and options, among other possible incentive rewards for selected players.

The LIVE SHOW is the focal point of the greatest concentration of interactivity among all facets of "the game" (S in FIG. 20). After all variables such as LIVE SHOW Subject Player TekPak transmission has been verified to have integrity (flow R on FIG. 20), the LIVE SHOW goes "on-air." On-Line Players can play along viewing the LIVE SHOW transmission either through the SITE itself or also simultaneous as a television broadcast, DBS broadcast, cable telecast, etc., (Flow J of FIG. 20). Clearly, the LIVE SHOW might have a non-participating viewing audience distinct and additional to the On-Line viewers/players of the LIVE SHOW (Flows N and O of FIG. 20). It should be noted that the LIVE SHOW preferably incorporates selected pre-recorded elements as well, within its content. The LIVE SHOW Subject Players are brought on-air selectively by way of the aforementioned TekPak and subsequently become the focus of attention as the questions which reside within the player questionnaire pertaining to that show episode are reviewed (Flow J of FIG. 20).

On-Line Players are encouraged to get a sense of the personality/characteristics of the LIVE SHOW Subject Player, as the questions are generally about them. Some questions are general trivia and supposition-style life-choice scenarios, while other questions are based on fashion, personal likes/ dislikes, interests, romance, style, talent, and other traits/ characteristics/persona-oriented questions that help On-Line Players answer questions that revolve around the LIVE SHOW Subject Player. Some questions are asked at the time of the LIVE SHOW to add spontaneity. At times, actual product is introduced during the LIVE SHOW, possibly by way of a celebrity endorsement brought on-air live via a TekPak, with the intent of establishing the products' application and appeal to the Subject Player and On-Line Players (Flow C in FIG. 19).

At other times, market data questions allowed by the Producers are integrated into the LIVE SHOW which relate to the featured Subject Player, or may be an addendum to other questions. This perpetuates the data-specific business of the site within what the Producers will allow to maintain show and context integrity from their point of view, as members of the target demographic.

The responses to most of the questions by the On-Line Players are tallied in advance of the LIVE SHOW during the 23-hour period preceding the show. The responses to a majority of the questions by the Subject Player have been calculated in advance as well in order to engineer specific questions and products in which to feature during the LIVE SHOW. A host or "MC" presides over the interaction between the On-Line Players and the Subject Player during the LIVE SHOW. On-line player responses submitted at the SITE level are compared to those responses by the LIVE SHOW Subject Player during the LIVE SHOW for points and prizes. As mentioned previously, On-Line Players are prompted for "write in" responses for additional points in addition to being rewarded if their relative multiple choice response was correct. These valuable subjective "write-in" responses provide banks of consumer data by keyword for featured products and services (Flow C of FIG. 19). For example, a designer can have a new line of outerwear reviewed instantly and in detail by a few simple audience prompts and corresponding feature on the show. New potential suppliers may be identified by way of these "write in" responses as well, drawing on the Internet audience for a wealth of options and possibilities beyond the knowledge of the producers.

The LIVE SHOW is engineered to incorporate player interactivity on multiple levels. As such, On-Line Players equipped with TekPaks can be brought on-air by way of their own live video and audio transmissions, referred to as a "Chime-In," to participate in the SHOW at the discretion of the Producers (Flow L in FIG. 20). This adds an anticipation element at the On-line Player level by suddenly being personally involved in the LIVE SHOW on a global basis, preferably without warning. During the show, players from around the world may be "pulled" into the show, in instances simply as facial reaction shots with their screen names visible, and selectively according to aspects of their performance on the site. Combined audio may allow for a collective worldwide "studio audience" reaction sounds within the show as well.

Just as On-Line Players can be brought in through live transmission, the aforementioned possibility of integrating surprise guests and special appearance celebrities to endorse or promote a product, or participate in the LIVE SHOW in some other manner is another aspect of the present invention (Flow C of FIG. 19). Promotional appearances, as determined to be context appropriate by the Producers, can be accomplished using the TekPaks. This allows special guests to appear from home without the need for a satellite link or special travel to remote studio locations and without the need for excessive lead time arrangements (Flow N and J in FIG. 20). Those special guests needing information to promote a product or service may be given access to the demographic data (flow E of FIG. 19), given that the Producers, in tandem with the On-Line Players input (Flow B in FIG. 19), deem them and/or their promotion relevant and useful to the show's content or the featured players' profiles and preferences (Flow C in FIG. 19). This access is quick because the information can be transmitted to the special guest using the communication network, preferably by transmitting the information to the special guest's computer.

Because products and services play a large role in the LIVE SHOW, auctions for products at special prices may occur at the auction page (#9 in FIG. 18). Here, On-Line Players may bid on products with points, cash, or a combination of the two. On-Line Players at particular levels who have achieved special memberships, or players who have purchased a membership with the redemption of earned merchandising points outright, may have exclusive access to certain auctions or paying privileges. For instance, these players may have the right to purchase an item with points only, or to receive special discounts on products that players outside of the membership would likely not receive at the discounted rate. On-Line Players may also evaluate product for points within this page (An aspect of flow B in FIG. 19). The information is stored in the database for selected paying suppliers of Goods and Services and reviewed by the Producers to determine products which may be integrated into subsequent LIVE SHOWS (Flow C in FIG. 19) based on popularity.

The LIVE SHOW progresses as Subject Players' responses are compared against On-Line Player responses to the same question and are awarded with prizes as their responses are confirmed with a majority percentage agreement with the On-Line Players (Flow F in FIG. 19). At the conclusion of the LIVE SHOW, Subject Players with enough favorable responses to place them in a "Winner" category will elevate themselves to a new level of player contention in which they are eligible to become a possible Co-Host for a day during a subsequent LIVE SHOW. They are in contention, for instance, for the Grand Prize which is awarded at the end of an allotted time period. For example, this Grand Prize may be education related i.e., a year of tuition at a school partnered with the LIVE SHOW. They may further become an intern functioning at the production facility or remotely as a Producer of the LIVE SHOW as well, depending on the player's level of collaborative involvement with his fellow team members or other players as a "Help" resource within the Help Line (#11 on FIG. 18). In the instance of a "teen show," those Producers acting as Teen Producers are selected from the top performers by the existing Teen Producers and can be paid short-term jobs.

The LIVE SHOW Subject Player who wins during the LIVE SHOW also wins points and prizes for his team members as well. This is because they worked together to elect this player to represent them collaboratively. As mentioned, LIVE SHOW players who "graduate" by winning the game may potentially continue within the game with a new role as a "guide." This option changes the basis of their points earnings to include providing "help" services to other Internet players, specific to the logistic and nuances of the site, game and LIVE SHOW. Another option is that "winners" graduate entirely, leaving the game. This "closure" further extends the educational aspect of the game, demonstrating another valuable aspect of life outside the game, where graduation means moving on to other activities.

It also noted that the potential for a "maximum" number of players each day might provide further incentives for players to meet criteria, including the completion of the needed answers for a day's program, to both further ensure the "special" aspect of being a player in a given day and to simplify the guaranteed number of interacting players each day (with a number guaranteed to be reached.) Knowing exactly how many will play is also a promotional point of the site regarding data sampling services promotion and other related advertising and site services evaluation.

It should be noted that the value of the consumer data elicited by the present invention is increased by the immediacy of the data being compiled through the live interaction. This interaction also improves the potential accuracy of the data.

A specific example of an implementation of the present invention is explained as applied to a TEEN demographic market using a theme of a prison system or society encompassing "the game." As such, the following parallels and terminology are applied to this example:

Upon logging in as a new entry or existing entry, On-Line Users or Players as listed are essentially "processed" into the SITE through the Log-in page and are referred to as "Inmates." All new Inmates are assigned to a "Cellblock" of twelve fellow inmates, all working collectively to attain "Parole," a high level of achievement within the "game." To do so, Inmates may advance to higher levels or titles either through the process of point accumulation, promotion by their fellow cellblock inmates, or by way of any of the methods listed described above. Each level holds different privileges and titles. For example, Librarian, Foreman, Yard Boss, Cook, etc. During game play, each level is color coded for easy reference.

Upon reaching an appropriate level of achievement, permission may be granted to submit a profile video by the Producers of the game's LIVE SHOW. The Inmate submits a profile video in the hope he or she can become a LIVE SHOW Subject Player, referred to as a "Parole Candidate" or "PC."

The process of data entry within the SITE of the game takes place primarily during the 23 hours prior to broadcast of the LIVE SHOW, heretofore referred to as "Lockdown." Inmates fill in responses and verify during the one hour LIVE SHOW broadcast of the game by pitting their data against the data of the featured PCs of the day. Inmates may be called in spontaneously to supply feedback via the TEK PAK during the LIVE SHOW, referred to as "Shakedown," but may be censured for negative response, foul language or other reasons, incurring a period of punishment or point reduction, referred to as "Solitary."

All activities during the LIVE SHOW period are governed by the LIVE SHOW Host referred to as the "Warden." He/she is not a Player. Preferably, the "Warden" is a professional actor, arbitrating the action between all elements which make up the LIVE SHOW. However, PC's who achieve parole through agreeable performance in relation to On-Line Inmate responses and a positive vote to advance the PC at the conclusion of the day's game can attain a higher level of achievement in the game as a "Co-Warden" for a day. This occurs only as the paroled Inmate continues to aid in the game and the other game Inmates through a post-parole society that revolves around the concept of collaboration and teamwork. The highest level for a paroled Inmate is the "Teen Producer" level, where they can work in tandem with Executive Producers to actually coordinate the production of the LIVE SHOW and other aspects of the game's SITE.

A system and method for accessing actual human personal preference and opinion data, whose unique demographic parameters are defined by an individual Internet user. The system includes a computer linked to a specialized database that allows individual Internet users to supply and access human personal preference data according to trait and preference variable data input to the system. The data input to the system includes the personal traits and personal preferences of individuals, including feelings, opinions, issues and purchasing or commercial preferences. A data correlating program provides data sorting parameters that are defined by selected degrees of human trait and preference variables.

Users, or those accessing the database for customized data results from the overall database, may, in turn, supply information to the database, or build a data profile, should they indicate that the data they seek pertains to individuals similar to themselves. With the present system and method, focus group data, or consumer preference sampling may be accomplished with immediacy and unrivaled relevance, as only users and members of selected relevance to the data solicitation might be contacted. Accordingly, discreet trait and preference specific groups of individuals that would be virtually impossible to locate and sample with typical focus group approaches are capable of being located and sampled with the present system and method.

The present invention relates to a system and method for referencing consumer preference data and merchandise and service "popularity" according to human physical and emotional characteristics, traits and personal preferences. In essence an animate, or "HUMAN" cataloging and method/system for researching and locating purchasable items and preference data, rather than an inanimate one. This system and method would preferably be Internet based, presented as a special Internet address and destination, comprising a "search engine," or searching means based on "searcher" or Internet user supplied human trait and preference data parameters.

The present invention provides options for "users" or "searchers," (those using the database,) to reference and compare other personal traits and feedback from "members" (those having supplied the core data to the database,) allowing the database to serve as a source of information for decision-making and correlation related to matters beyond the purchase of products and services: In essence, a "people" based Internet SEARCH ENGINE rather than a "things," brand category or typical word-correlating search engine.

In placing the control in the hands of the Internet searcher, the intrigue and interest in the options provided by the search engine grows. The very demographic specific information that advertisers seek, is the same sort of information that individuals wish to know about each other.

Further, the present invention in providing such discreet targeting research means for Internet users, Internet advertisers are reciprocally empowered with new consumer targeting means, based on remarkably discreet demographic groupings based on consumer determined parameters. In building such a special database and search engine, advertisers are further advantaged editorially, as database information relevant to their brand or industry can form the basis of "search relevant" factoids, which are in fact paid flash advertisements relayed when the factoid information is deemed relevant to the searchers' information quest.

Accordingly, a system and method for accessing actual human personal preference and opinion data, whose unique demographic parameters are defined by an individual Internet user is provided. The system includes a computer linked to a specialized database which allows individual Internet users to supply and access human personal preference data according to trait and preference variable data input to the system.

The system contains a data correlating program which provides data sorting parameters that are defined by selected degrees of human trait and preference variables. Further, data pertaining to any one of these trait and preference variables may be assigned special program value, should special importance of the selected data be indicated by those who access the database. Variables not provided by the system to the Internet user are preferably provided by the user as keyed-in, or otherwise subjectively supplied data that may be included in data correlation and reports for that user. Users, or those accessing the database for customized data results from the overall database, may, in turn, supply information to the database, or build a data profile, should they indicate that the data they seek pertains to individuals similar to themselves. The data they seek and supply pertains to their personal traits and personal preferences, including feelings, opinions, issues and purchasing or commercial preferences.

With the system and method of the present invention, users may refine their demographic of choice within a search, by way of system provided options deemed to be standard options provided to users at selected points within a search. Users may also refine their search by re-entering the demographic related trait and preference data, preferably by re-accessing Internet site screens already accessed within the same search, for input of revised demographic parameter data.

Further, the present system and method allows advertisers to target their information (products and services) with extreme specificity to users, as the users themselves are defining the areas of demographic interest. Advertisements may occur as editorial comments with Internet links, pertinent to data in the database specific to a products' or services' sampling results. These "factoids" may be calculated and relayed specifically to a single user who has met subjective system user relevance criteria to receive selected advertising data results. Further, focus group data, or consumer preference sampling may be accomplished with immediacy and unrivaled relevance, as only users and members of selected relevance to the data solicitation might be contacted. In other words, discreet trait and preference specific groups of individuals that would be virtually impossible to locate and sample with typical focus group approaches are able to be located by the present system and method.

Some important aspects and benefits of the present invention, include that it provides:

A unique database of value to consumers, advertisers, brands and other organizations seeking extremely discreet and quick, specific and accurate consumer preference feedback.

A database which can be referenced with a virtually infinite number of demographic options, from broad to remarkably specific, with a large range of preference responses becoming available. And, with the preferable ability to modify micro-demographics being sampled based on user revisions of the search based on selected preferences and opinions.

A searching innovation for consumers which will attract new Internet users to any "parent site" preferably housing databases based on the present invention.

The ability to cross-market, co-venture and/or couple with other brand's sites, other e-commerce sites and other internet properties in general, linking to and from by virtue of the unique revelations and options that the invention creates for both consumers and businesses.

New means for people to connect with the specific types of people that can assist or benefit them in their unique, personal and professional circumstances.

Revenue potential of Internet based resources involving the technology of the present invention would likely be derived from options including:

LINKING from featured brands to brand sites or purchasing options.

FEES for brand inclusions in pull-down screen options (pull down screens provide "options.")

ADVERTISING: Banners and "factoids" for brands when certain areas of interest are explored (pop-up promos and information related to the selected traits and/or preference data.)

SALE OF SPECIFICALLY SOLICITED data, requested by clients via standard member data solicitation screens, or specific short-term "pop up" data prompt screens/menus.

Attraction of new users to a parent site and that site's services

The direct sale of selected items or revenue from linked sales or referrals.

SALE OF DATA that is more comprehensive and not searchable on the site by members.

FEES charged for relaying names of SEARCHERS and/or MEMBERS who agree to have literature of mail forwarded from selected brands, or brands within selected categories.

FEES to members to use the service and to email each other and receive other site services reserved for members, potentially offset by meeting data-supplying or site usage thresholds.

FEES to brands to be "multi-listed" or programmed to appear when a MEMBER or SEARCHER references "suggestion" screens which may list brands to consider in supplying accurate preference data.

ADVERTISERS can send ad messages within the CLOSED email system with remarkable specificity, reaching their "dream" demographics and audience, with the same ease and focus that MEMBERS do, with their own personal messages.

Please note that in the foregoing description, the term "database," when described as performing a function or correlation, includes computing means which manage the database. The computing means includes a database and a database management system which receives, sorts, compiles and stores the individual personal trait and preference data in the database into searchable records.

The system and method of the present invention provides the individual Internet user and searcher, ("user") the option of entering or identifying variables, including human traits, and other variables/aspects familiar to the "human condition," in searching for information of personal relevance. For instance, an Internet "shopper" might have curiosity about particular preferences or shopping data of other "single women, gay, 18 to 24 years of age, "active" in demeanor, who is a DEMOCRAT politically, earning over $100,000 per year and who has a very "optimistic" outlook or attitude." This inquiry would be entered by way of a series of keyed in or "site provided" variable options (for example, by a pull-down menu such as that shown in FIG. 6), selectively input by the shopper or user and then referenced against the available database of "MEMBERS," or people who have willingly and directly supplied personal preference data and screen names to the database in exchange for incentives, or in exchange for data they sought from the system (FIG. 2).

The intent of the Internet visitor may be determined when initiating interaction with sites based on the present invention (FIG. 3). On "signing in," those searching for data, and those strictly supplying a data profile to the database for direct incentives, may be discerned.

Variable options not provided to the user pre-set, as in via "pull down screens," could selectively be keyed-in by the user for selective inclusion in the "search" should this keyed-in, or otherwise supplied data variable be understood and usable by the database searching and correlation means. This "manually input" word or phrase recognition option would allow for ever-more discreet searches, allowing for correlation and similarity with members within the database to become very specific. Perhaps more importantly, when those users who are searching the database for personally relevant, human interest information about a specific type of person (though they may not be using the database to shop or purchase), may be presented during the search with a myriad of advertising and purchasing options relevant to that user's search and demographic(s) of interest, thereby providing commercial value to those SEARCHERS/database-users who are not directly "shopping."

Figure 16:
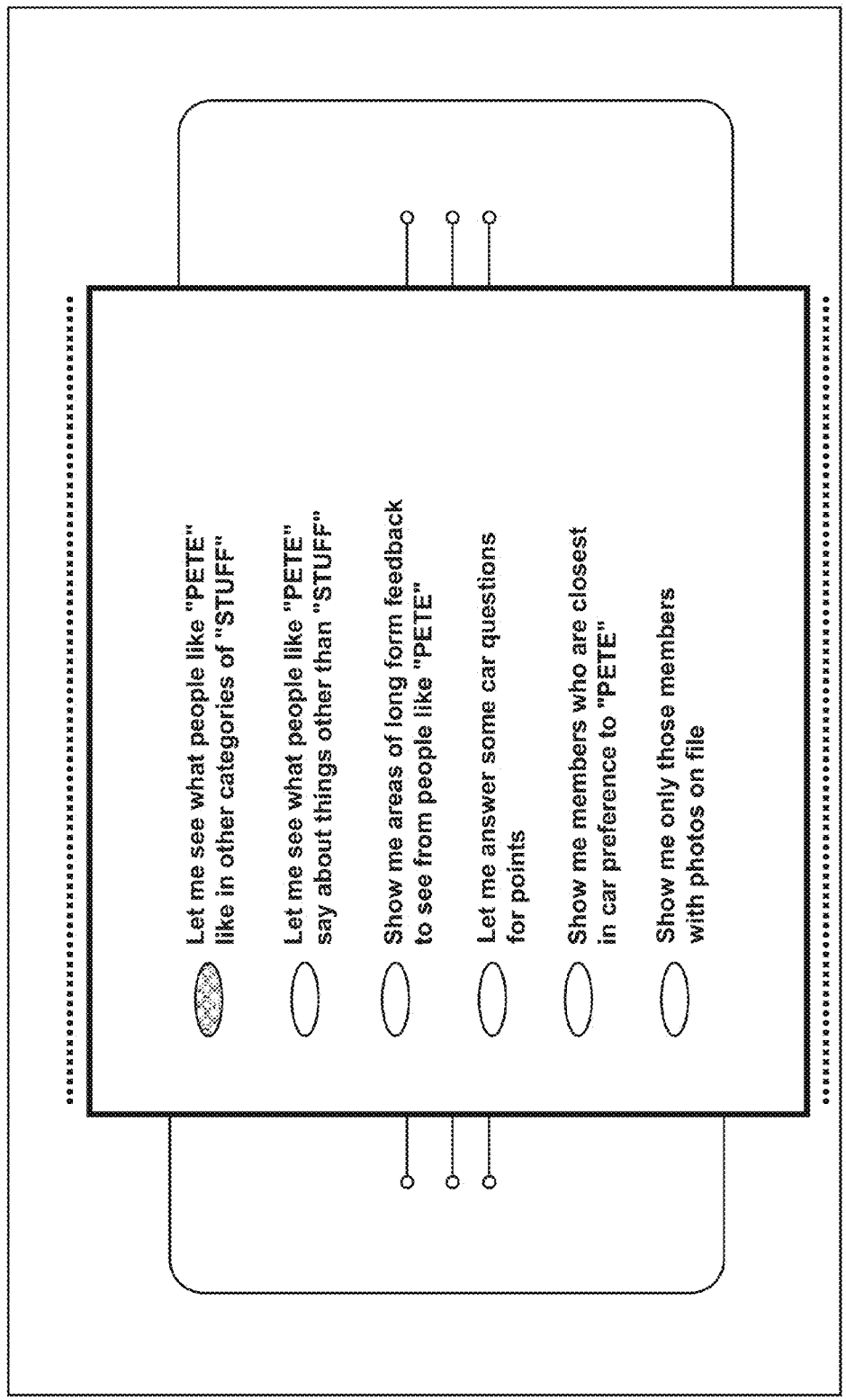

Users may refine their demographic of choice within a search, by way of system provided options deemed to be standard options to provide to users at selected points within a search (FIG. 16.) Users may also refine their search by re-entering the demographic related trait and preference data, (FIG. 6,) preferably by re-accessing Internet site screens already accessed within the same search, for input of revised demographic parameter data.

Figure 17:
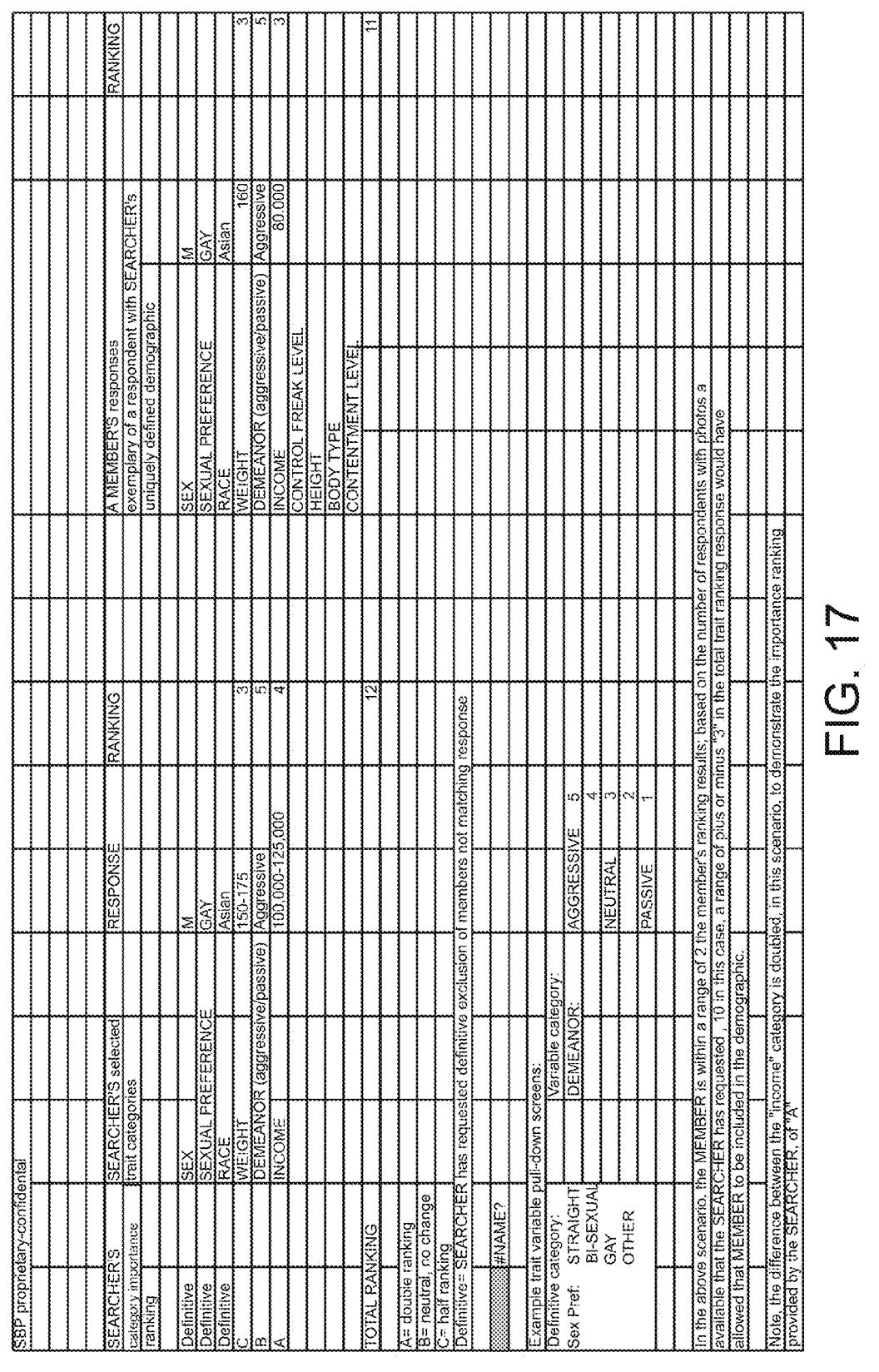

A computer and program (FIG. 17) capable of correlating values of trait and preference parameters would accommodate selectively frequent revisions of the selected group of database members relevant to a user at any particular point of their search: Revelations about selected opinions or preferences might lead a user to revise a search based on new interest in individuals who share that preference or aspect, (FIG. 12.). The database members included within a demographic may also be affected by other user-selected options, such as those affecting the scope of the group sampled, (FIG. 8.) Values assigned to the provided trait options used to "define" the initial demographic whose preferences are of interest to a user, might be affected by a variable degree of importance as selected trait might have to a user (FIG. 6.) For example, if weight is a critical aspect of the sampling, the user might select the highest importance option from several provided, giving this data more weight in the computer correlation of this variable in selecting a sampling from the database to analyze and relay to this particular user, as Internet transmitted data. A multitude of variables that a user might selectively include in a search, would mean that correlating means would include predetermined, subjective thresholds of correlation relevance for "members," (those who have data profiles within the database,) to be included in any sampling relayed to a user that reflects a group determined to be selectively similar to the user's demographic request. These predeterminations would be made by those who construct any application of the present invention, for instance, a group that might employ the present system or method in creating a TEEN Internet site, which allows young people to search data of teens based on combinations of traits defining a range of teens deemed to be of special interest to the user.

Figure 5:
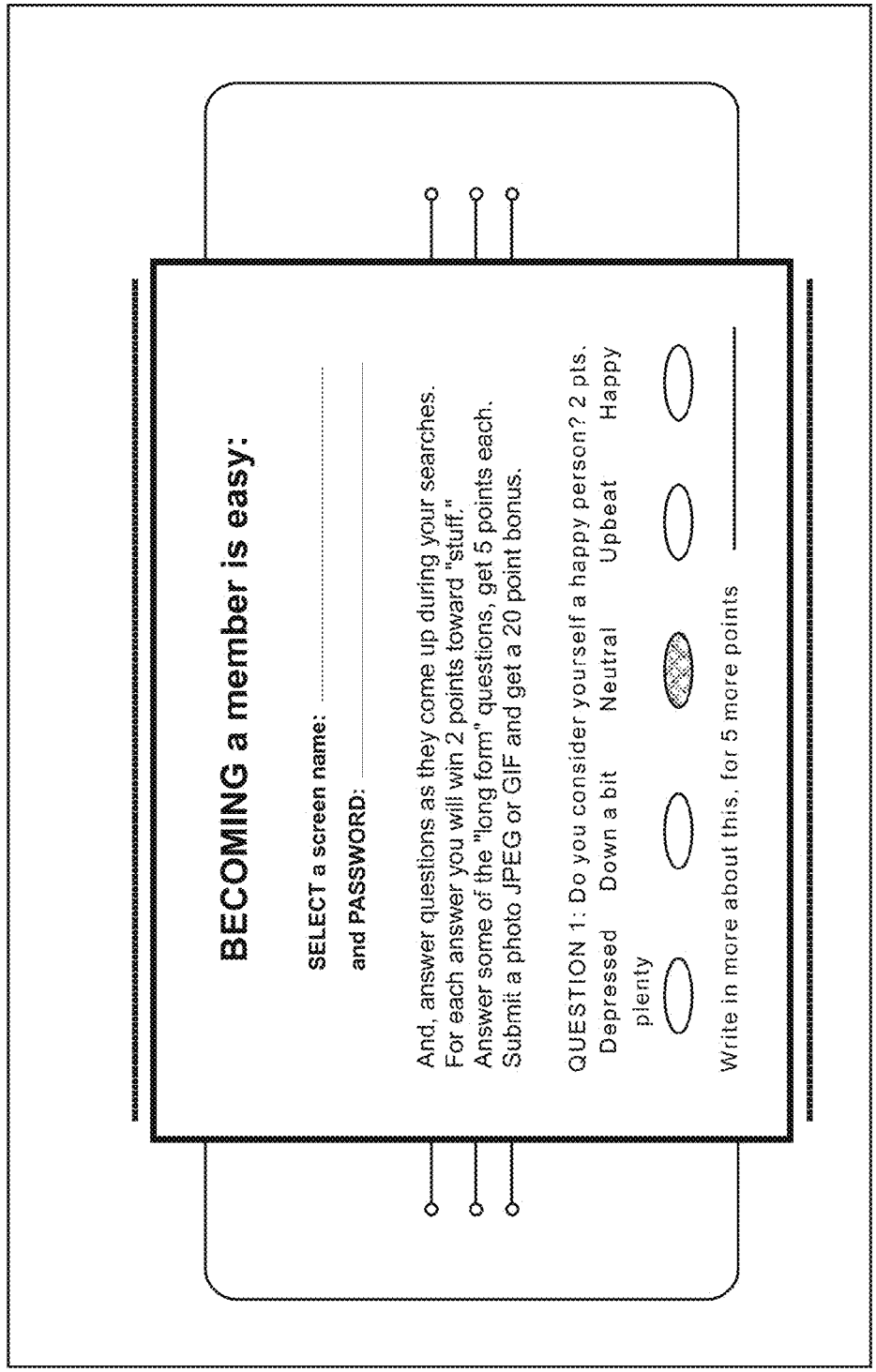

Incentives could clearly be provided to members (FIG. 2) to encourage the growth of the core database, such as direct rewards in cash or gifts, or the potential of incentive options. Incentives could be made available specifically to the user as well for "offering back" preference data, (FIG. 8) to be incorporated in to the database of the site related to the present invention-growing the database as it is used Rewards need not be limited to these aspects though. In collecting specific personal, trait, preference and merchandise data from selected users, ever more data cataloged and recallable by users according to the traits of people and not things, may be compiled. Preferably, every user might become a member, and could be encouraged to do so (FIG. 5.)

Figure 7:
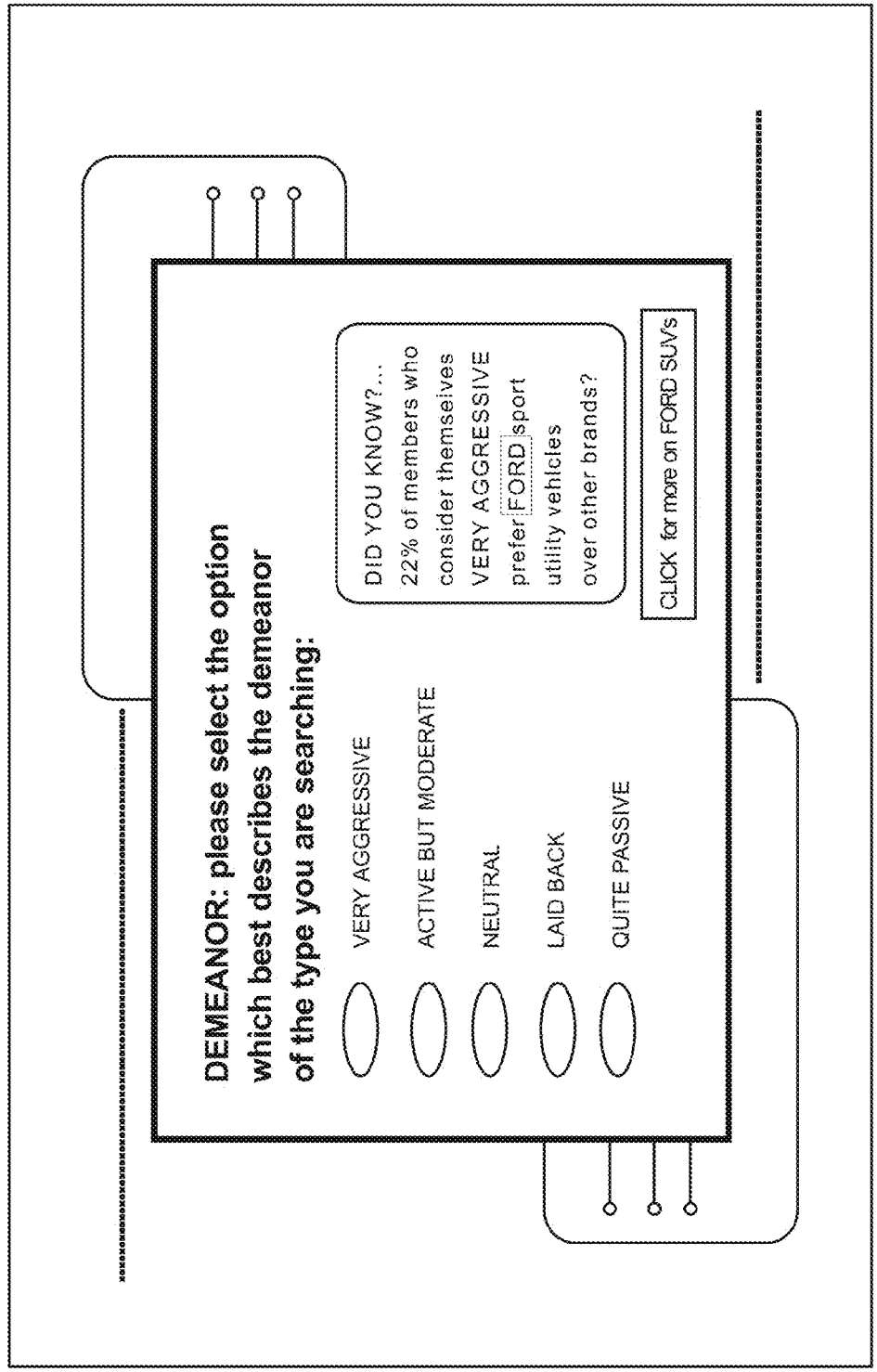
Figure 10:
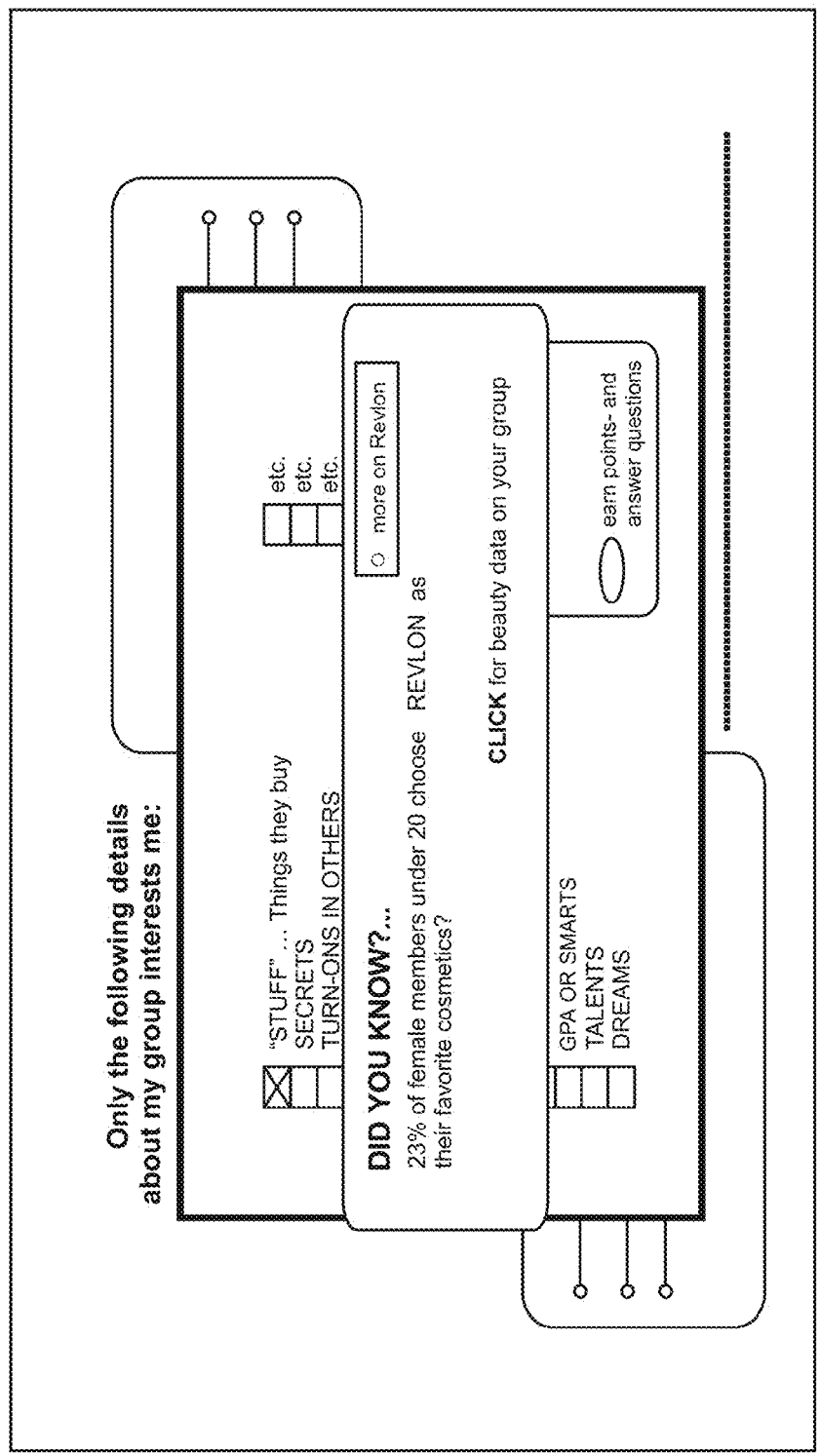

Objectives of the present invention are to provide new, discreet personal comparison means, and to provide new sources of purchasing/consumer information, by providing a forum for users to "relate" and identify with other specific types of people and consumers. Commercially, the present invention provides a "personal shopper" which is preferably unique to every user, as the personal shopper is a single, unique member of the site, or site-presented conglomeration of members fitting profiles deemed related to a user's data input and search parameters. Further, advertising may be targeted with relevance to both users/searchers, and advertisers (FIGS. 7 and 10.)

Figure 4:
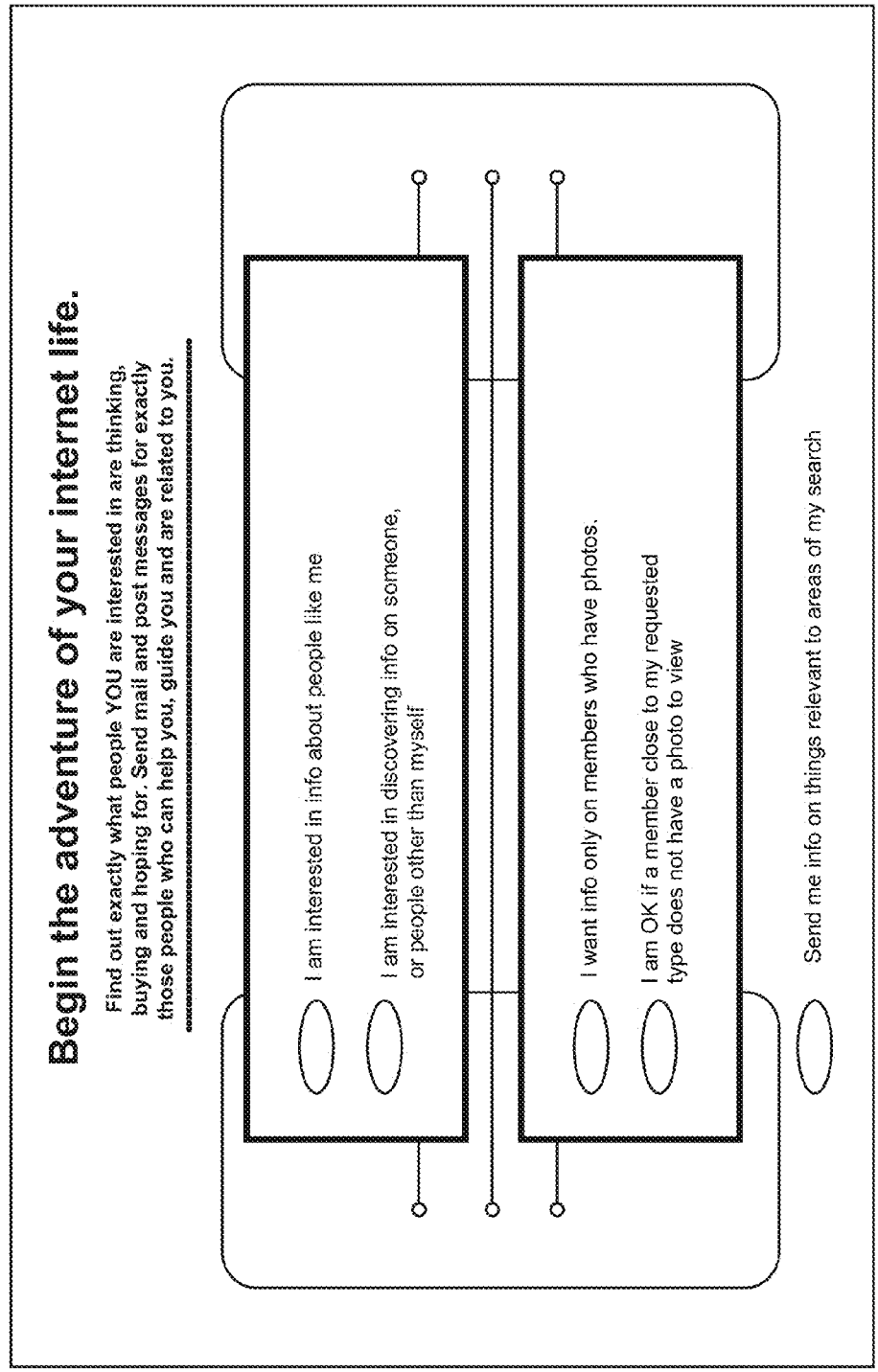
Figure 14:
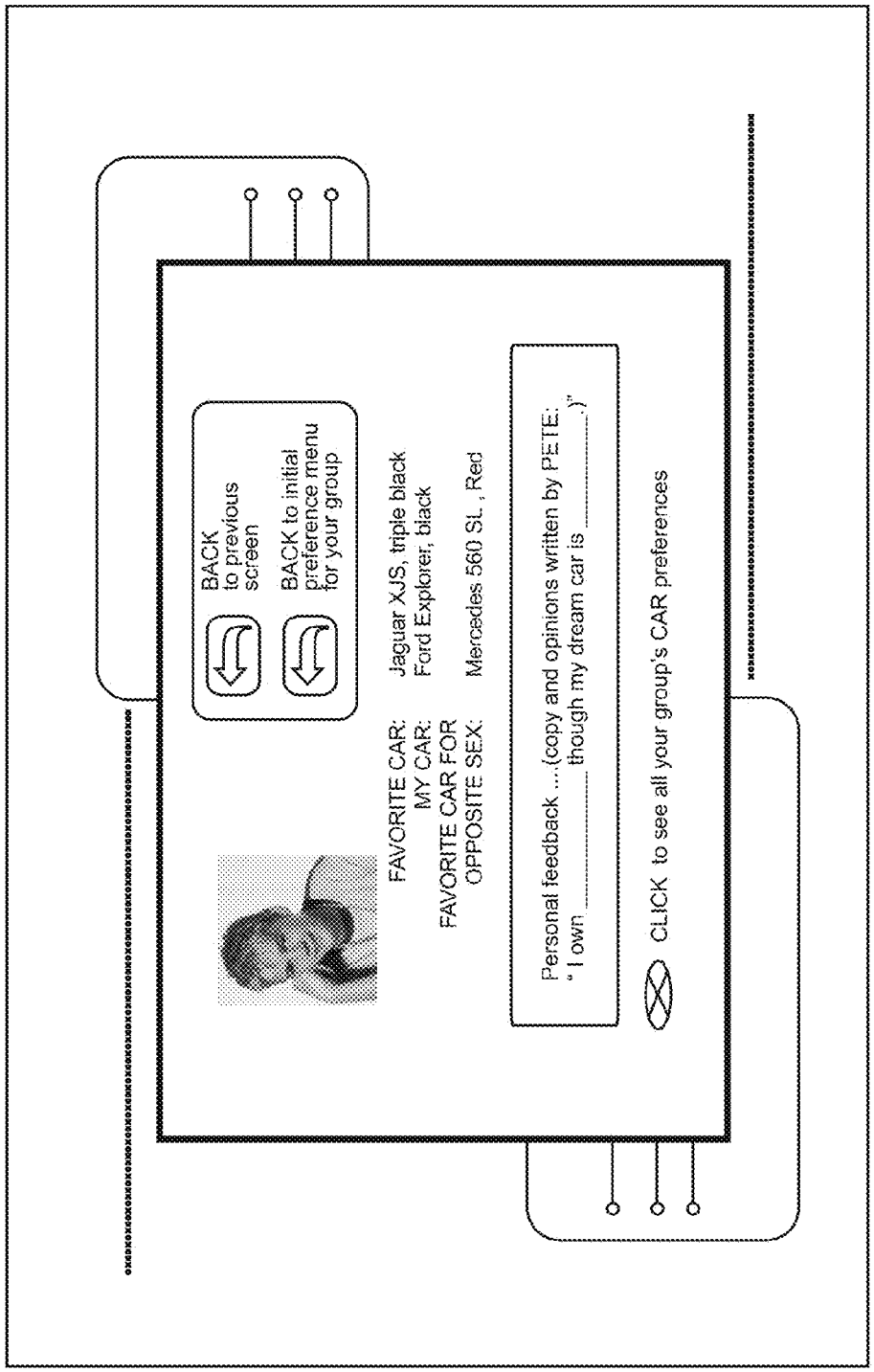

In being able to reference human trait and personality variables, people who the user/shopper may want to emulate, or not emulate, may be referenced for instance; people similar to the user may also be sampled, allowing individuals to compare learn and compare to those who may share their circumstances (FIG. 4.) This allows for unique learning about the things, places and purchasable items they have, would want and prefer. Further, searching for understanding of individuals whose preferences may be foreign to the user, such as a young woman searching for a gift for an older man, is facilitated by the present invention. Further, important personal decisions may become better informed by the "pull down screen" and long form (written) feedback (FIG. 14) from people who best relate to a user's circumstances, issues and "type" of person designated, from the overall database "membership."

Advertisers may target their information with extreme specificity to users, as the users themselves are defining the areas of demographic interest. Advertisements may occur as editorial comments, pertinent to data in the database specific to a products' or services' sampling results. These "factoids" may be calculated and relayed specifically to a single user who has met subjective system user relevance criteria to receive selected advertising data results.

Figure 11A:
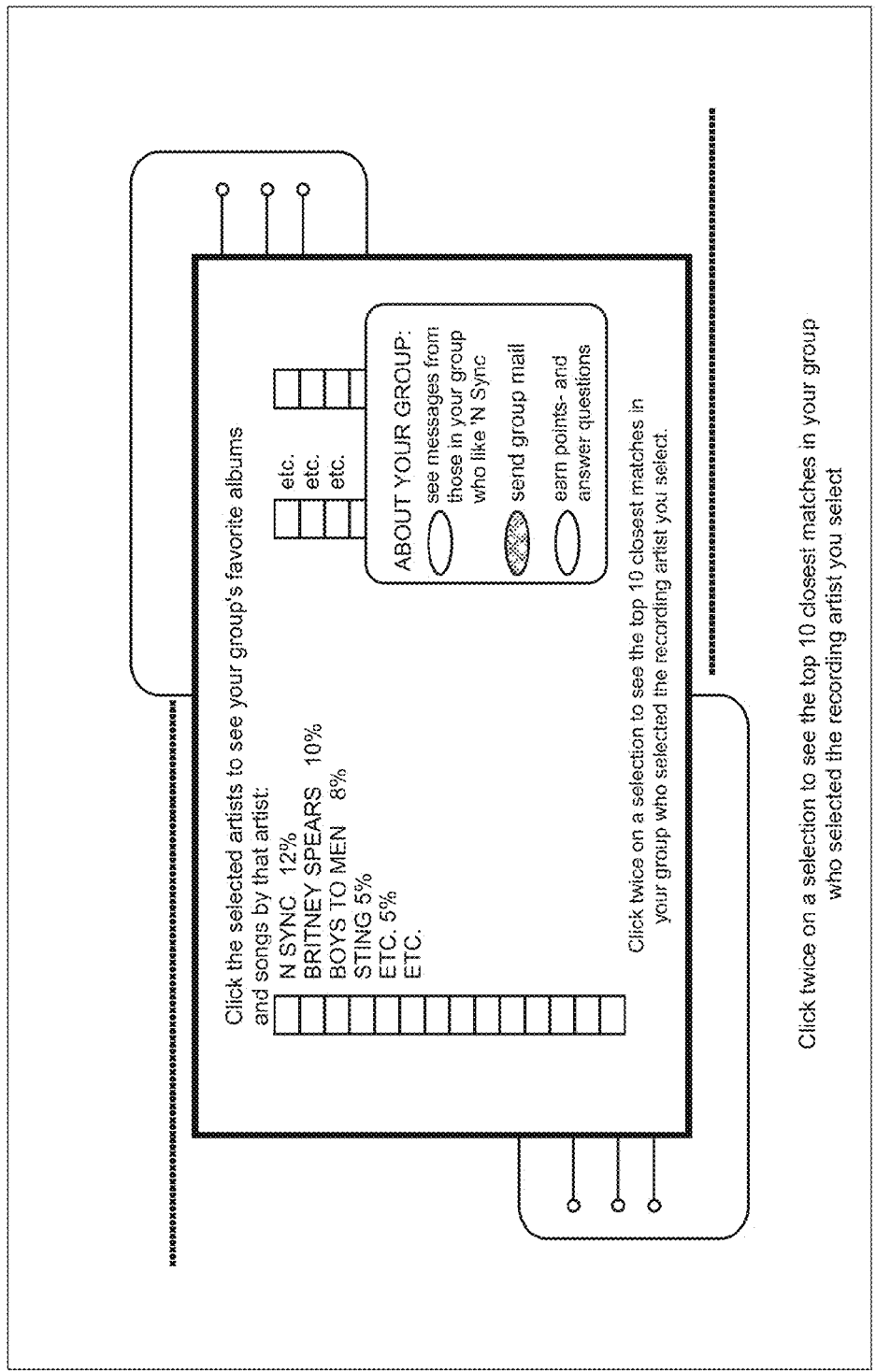
FIG. 11A illustrates a database correlation results report, detailing current music preferences of the user-defined demographic grouping of database profiles, i.e., people. This Internet screen report further provides interactive options to the user in defining the next stage of their search, including more discreet data related to the music results showcased, and the option of displaying a selected number of actual database "members," or users who have profiles within the database, who meet selected similarity criteria to the users' selected trait and preference parameters.

Further, focus group data, or consumer preference sampling may be accomplished with immediacy and unrivaled relevance, as only users and members of selected relevance to the data solicitation might be contacted (FIG. 11.5.) Accordingly, discreet trait and preference specific groups of individuals that would be virtually impossible to locate and sample with typical focus group approaches are capable of being located and sampled with the present system. For example, a movie company might give a "bio" of a new film, and submit a question that the system would relay only to users who are women between 18 and 24 who show a particular interest in fashion and beauty, the question being: "Which of the following actresses would be most likely to get you in to the theatre, should they play this role in this movie?" A write in option could naturally also be provided, for unsupplied response options. The result being, firms in every industry can solicit focus group information from remarkably targeted, and immediately accessible consumers.

The present invention provides a new level of Internet options and service, based more on a "thinking" model than a "factual" model, where absolutes are not what is sought by users but information found between who the user is (or the "type" of person they are shopping or researching about,) and who those profiled in the database are, and what and how they choose in the context of how they feel, look and behave. This invention is a "human search engine" of the Internet, and a database that allows the user, or SEARCHER, to search human preferences and feedback, based on human traits and parameter options. Further, this invention provides the internet user the proactive control over sampling, instead of the familiar approach of the Internet world to passively sample Internet users based on their general activity on the web, such as what sites they visit frequently, etc. This is a slow and inefficient means to learn from users who are able to proactively provide discreet data about themselves, by seeking discreet data for their personal needs and reference. This is the function of the present invention.

In a preferred configuration, the "micro-demographic" of the USER or searcher, is first determined through a trait-based selection process, (FIG. 6) wherein selected definitive and variable traits are selected and ranked by the user by relevance and importance to that user's search. The scope of the database similar to the parameters might be user defined then, based on system-supplied options (FIG. 8.) Secondarily, the "preference" options of interest to that user (FIG. 9) are provided, to allow for very discreet areas of feedback to be compared about and within the users identified "trait based micro-demographic" of interest. In navigating a user's selected group's, or demographic's, preferences and feedback, options for continual "refinement" of the demographic being searched are selectively provided to "tailor" the group being studied to user priorities as they may change during a single search.

Typical shopping means on the Internet currently include searches by product or service type, searches by brand name, and personal shopper assistance from a "helper" that is not necessarily defined by the user, unlike the present invention. By sharing preferences, opinions and personal observations about self and others in the context of purchasable items and general human interest information, a venue not only for newly informed purchasing is created, but a forum for support, gift ideas, self-improvement and broader awareness of others among other results is also created. For instance, an overweight person embodying certain specific insecurities and physical circumstances, might find new ideas of what to wear to address appearance concerns by referencing people with similar circumstances, and their recommendations, observations and preferences.

That same person might learn how other similar "overweight people" deal with people who react negatively to "overweight" people; or how "thin" people feel about their own appearances, and the appearances of people the consider to be "overweight." Further, a new business woman with specific physical and emotional traits, unsure of what to wear on the job might find her best recommendations from business women whose feedback and selections educate her to ways to advantage her in the new circumstance, from those who have already experienced it. And, a young woman wondering whether to date a certain man can reference personal feedback from both women like herself and men she deems to be similar to her potential date, for broader awareness of both perspectives in decision making; whether data is product and service related, or simply selected personal and emotional feedback.

Perhaps more importantly, that person may have entered in to a search with "weight issues" on their mind initially, and ended up focusing on people who share a common travel interest, as an exciting range of featured preferences and opinions of members, or profiles, may be revelations that steer a user in to new areas of interest, increasing commercial versatility and reach of the invention for advertisers.

A vital aspect of the invention is the fact that the "MEMBERS" or those people who have belong to the database of the present invention, having willingly, directly and proactively supplied data about themselves to the database. By prompting SEARCHERS to "join," discreetly or with incentives, or with the requirement to answer selected relevant questions in order to further use the database, or to go to a deeper level in the database (such as to review long form, written feedback from members,) the database of the present invention can be virtually "self feeding" for information. Further, as the SEARCHER or user is seeking true information, it is unlikely they will lie or deceive in supplying data to the database, as their mind-set, or "mode" will be truthful to and to think to supply deceptive data while searching what they anticipate is true data, is unlikely.

The additional option of still images and video (FIGS. 7 and 8) may be provided by members as further personal "data" compiled within the database is important. In being able to review still or motion visual content, or photos, or selected real people who have provided these images to the venue or site (perhaps in exchange for selected rewards,) the shopper/user can identify further those people of interest and those other consumers who's choices are of interest and relevance to the shopper/user in determining their own choices. In being able to reference as broad or as narrow a category of people to review, (those "most similar to the search parameters" for instance,) very discreet and emotionally based choices can be made by way of the options of the present invention, tapping in to variables more closely associated with self esteem, role model emulation and personal aspects of featured people. Searches may include several "rounds" or refinements, wherein a final stage of selection by a user in creating their micro-demographic of interest may include reviewing available photos, or responses in manually input fields, for more specific member selection (FIGS. 12 and 16). The option of excluding members (FIG. 8) who do not have photos available is selectively an option, to maintain interest for more visual searchers/users.

On selecting a single member to review, including long-form feedback available (FIG. 14), a search might be broadened from "self esteem" issues for example, to "car preferences," wherein the searcher can broaden the scope of the search at that point to sample his entire group (or originally designated trait-based micro-demographic), to review their overall preferences on the new topic by percentage (FIG. 16). This option demonstrates the selectable versatility of searches of databases of the present invention, as the choice to reference "car preferences" was prompted by the profile/feedback screen of a single member, who was referenced by the searcher/user based on an entirely separate area, or motivation, of interest/curiosity.

Figure 15:
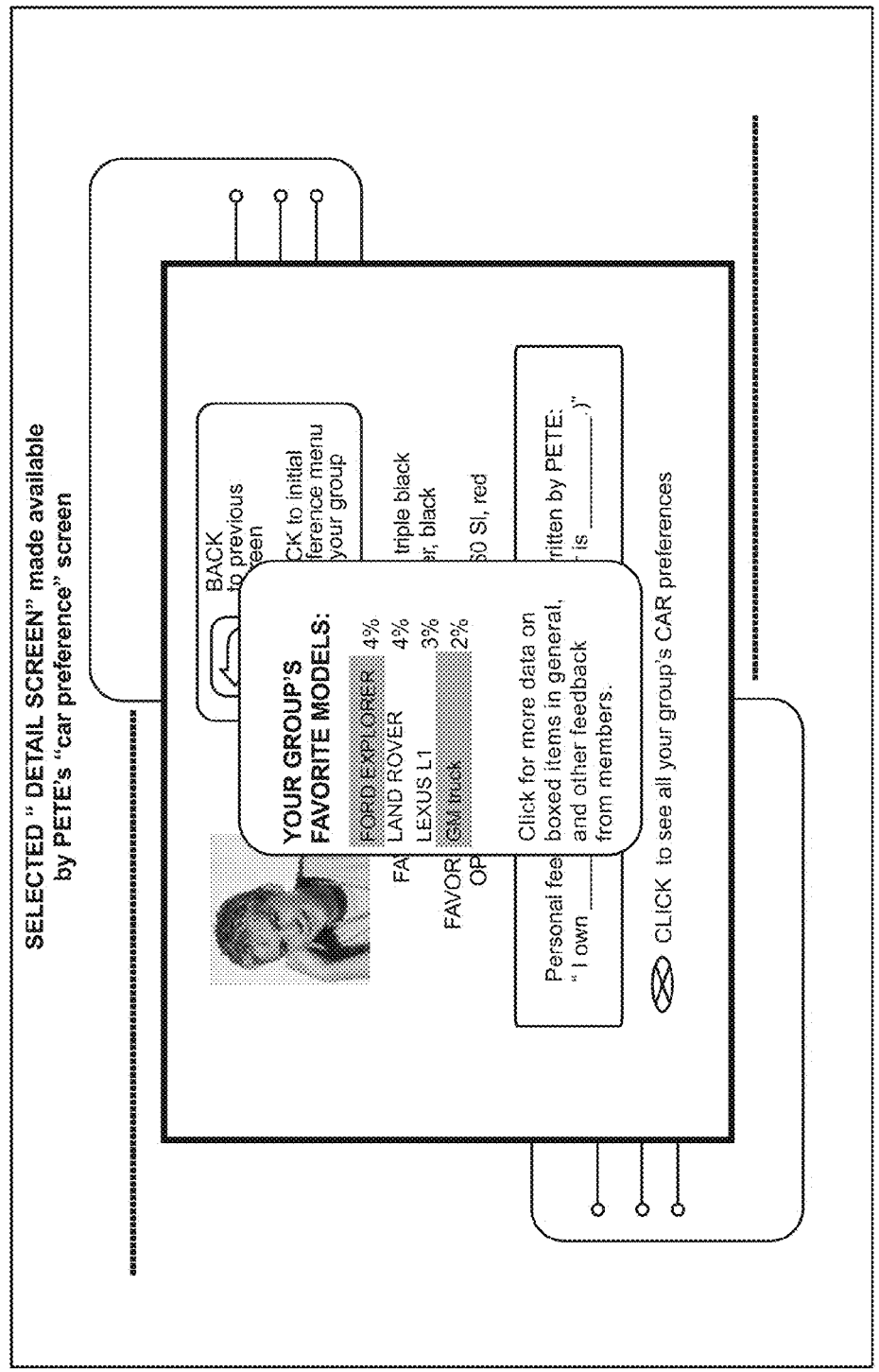

Options in reviewing response data, specific to products and services for instance, may include a correlation of both product "types" and brands and/or styles within the selected micro-demographic identified by a user. For instance, within the trait data a user has input, 50 members constitute the top 1% of members most closely related to the user's selections. The user is interested in seeing what cars his selected micro-demographic prefers (FIG. 15.)

The database is referenced by the site in response to the user's search, and the search result provided to the user confirms that 10 of the 50 members in the 1% correlation group prefer SPORT UTILITY VEHICLES; on requesting brand preference, the user is supplied with the information that 5 of those 10, or half, prefer the FORD EXPLORER, 2 of those 5 own a FORD EXPLORER, and 4 of the 10 prefer the color BLACK in a SPORT UTILITY VEHICLE. In another search, a user may determine that he wants to use the top 100 members closest to his search parameters: of these members, the user is curious what watches the group owns; the site search of the database determines that the user-selected micro-demographic includes 92 members that own watches, of them the top brand is ROLEX, of which 24% of the demographic owns, 35% of that 24% (who own Rolex's) own a PRESIDENTIAL model in Gold. In a more general search regarding watches, the user also learns that his uniquely created demographic prefers SPORT watches (52%) over any other category "type" of watch. "Long form data" review of a selected member (due to interest in her photo,) within the trait-group reveals to the searcher that this member of special interest to him/her is feels that "people with gold watches are often unfaithful to their spouses."

Such multi-leveled searches may be configured according to percentage of respondents meeting a selected degree of correlation with a user's input search data, (FIG. 17,) or a selected number of members coming closest to matching said user's data, or "bin" of members built by a user from his own personal criteria (unrelated to database means for correlation.) The means and options for correlation and member micro-demographic selection by a site referencing the database, or by a user, is virtually infinite, much the way the entire database of the internet may be referenced and cross-referenced in a multitude of ways, by way of search engines that approach the task in a variety of different ways.

The consumer preference data collected by this site would be of considerable value to many, as the discreet categories of traits and personal profile aspects could be as narrow as desired by those operating site(s) and venues utilizing the options provided by this invention. Far more detailed than just age and "who bought what where" data, the present invention takes demographic data to an entirely new level. Specific, relevant questions may selectively be "purchased" by firms needing feedback from the unique preference and/or trait-based demographics provided by databases of the present invention.

The present invention could further involve data to be provided based on sub "categories" determined directly by users/shoppers, by way of a key-in means, allowing for unlimited options to be relayed from users, for selected processing and categorizing based on correlation between data related to trait and human aspect categories offered directly by users, not having been yet made available as a "pull down" or on-screen icon option. A demographic might even be identified by user's by requesting members who identified a new sub-category manually, that had not been presented within supplied (pull down menu) options, for instance (FIG. 6).

Further, the present invention could provide options including selected processing of the data from users/shoppers, including the option of people (specifically provided to review the database,) reviewing and categorizing data from respondents according to parameters relevant to the site needs, or venue needs, to define selected data-groupings of member feedback. In other words, human involvement in reviewing more complex data from members might provide additional sectors of information within the database that might not have been categorized or included as they may have required human interpretation to be placed subjectively in to a searchable bin, or data category.

A virtually infinite number of "micro-demographics" can be created and made available for users to reference, with selected "narrowness of focus" in pin pointing groups and types of people; it is possible that no two users may ever identify the same demographic in a search.

One very important aspect of the present invention is that application options based on this invention might allow for direct shopping, or items actually purchased by way of site(s) featuring options created by this invention, or such site(s) might refer users/shoppers to other sites via links, once preferences have been identified that have a corresponding site for more information and in some cases sites for transacting purchases of items displayed in accordance with searches by trait conducted by way of the method and system of the present invention. Links back to a site such as one(s) created based on the present art, could be made from vendors including in links from such site(s) based on this art, increasing the user base and providing a research and information service to consumers made available by the links from other sites. Listing brands as options and suggestions in both searcher and member pull-down screen options, (FIG. 15) is saleable to advertisers and brands to be "out of site" is "out of mind," so the desire to be included in the database results could be very strong for advertisers; links to their sites or purchasing means is secondarily a potentially saleable option as well (FIGS. 7, 10 and 15.) In identifying special and perhaps unusual personal areas of interest, uniquely targeted and formatted advertising opportunities may be created.

The present invention may provide a selectively "pure" database that in no way is biased toward any selected options or brands, or the database may allow for all possible selections, but provide greater visibility and promotion of selected brands within user selected categories. Naturally, should the scenario be the latter, keyed-in options that may not be a brand that is specially featured, may provide search options listing brands or options that were not within site-supplied names; in this scenario, such a brand or name could be listed in the results, showing the degree of correlation; though, the inclusion of a link to that brand or supplier's own site, or the provision of direct shopping means of their items, or inclusion within pull down menus (due to a brand or name's popularity with members,) is at the option of the database owner (FIG. 15.) Having said that, the option of selling products and services, or providing other referral and information services directly to users and members is possible, is an aspect of the present invention, and is also an option of the database owner, or owner of the site/searching means of a database based on the present invention.

The options of the present invention could be featured as the primary and independent searching means in selected site(s) involving the methods or system herein, though they could also be incorporated as aspects of a conventional, existing or familiar e-commerce site, providing additional referencing latitude to the shopping and/or utilization of said site(s). Thus, shopping could be done by product in the familiar ways, such as by product category, and by way of the special trait and human profiling and characteristics the user selected/created micro-demographic referencing method of the present invention provides.

The application of sites that access a database based on the present invention also includes a myriad of options. For instance, a publishing company that owns several magazine titles, may have such a site. In this scenario, promotions within their magazines might draw consumers to the site, to become members and to provide core data to the database; those new members might receive selectively large incentives, whether gifts or winning potential, based on the amount of data input, meaning that selectively a member who supplies a photo or video of himself would qualify for more reward. Such a publisher might provide SELECTED brands or clients within pull down screen (site presented) options to users, as the owner of the site would have control over the categories of trait and preference data members and users receive as prompts from the site.

Further, the brands listed within commercially based options and pull-down menus, might include brands that are paying to be listed, or brands that are qualifying to be listed as determined by the publisher. Meaning, the value of controlling such a database for a firm such as a publishing company, includes the ability to provide incentives to advertisers (or selected companies,) to be included in lists that would make their brand, product or service a visible option to members and users, increasing the likelihood of their brand and product being listed and referenced in searches by users.

Further, selected brands meeting criteria determined by the publisher in this case, (or owner of the database in a broader sense,) may have their brand or name listed in bold and featuring a direct LINK to their own site, meaning that the site based on the present invention could potentially draw clients and buyers directly to selected brands' information and/or e-commerce sites, at the user's option. Further, members and/or users who input selections specific to brands meeting criteria of the database owner, may be prompted to allow for materials or other solicitations to be sent to them by selected brands, or product/service providers. Whether cooped with a publisher, a separate conventional search engine, or other property including e-commerce sites, configurations of the present invention for Internet application are many.

Figure 9:
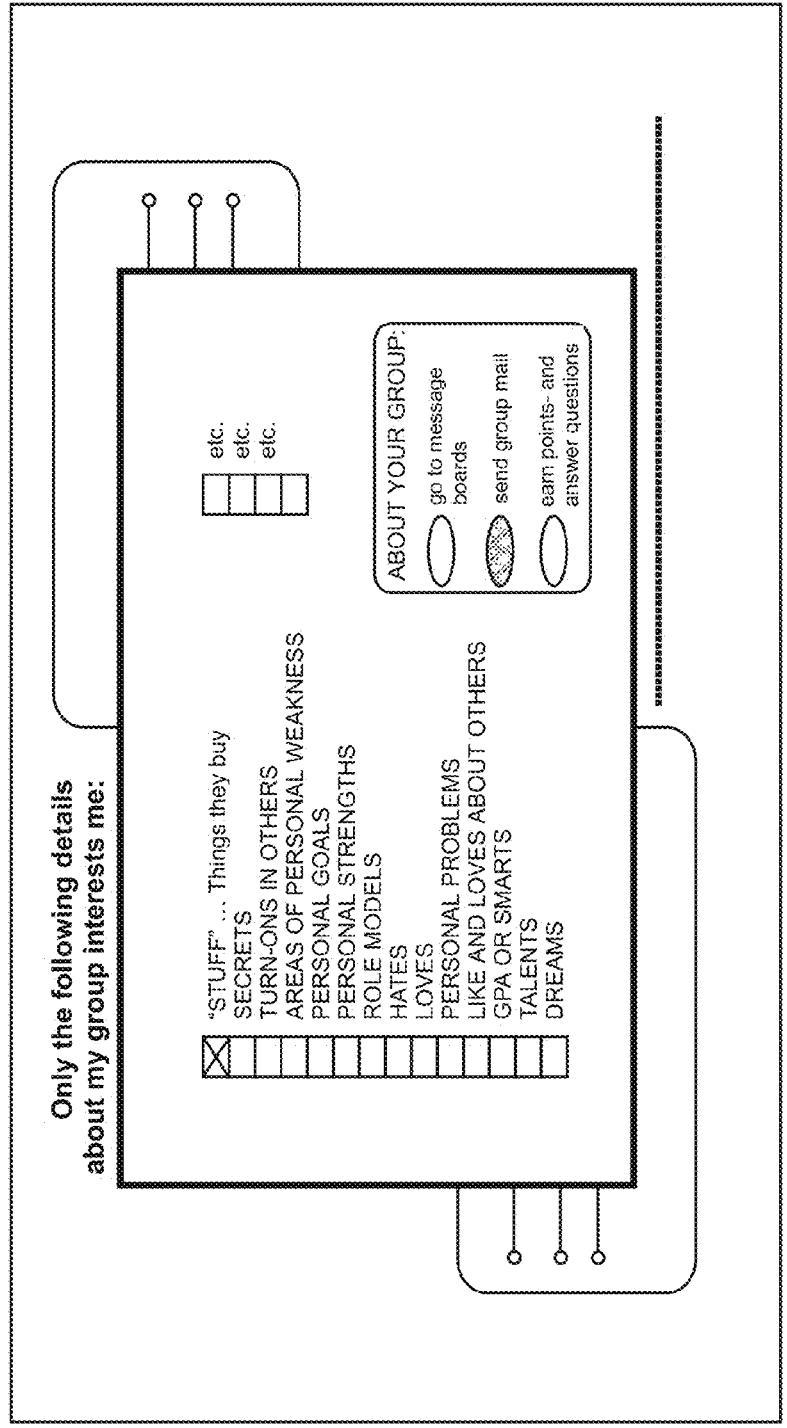
Figure 13:
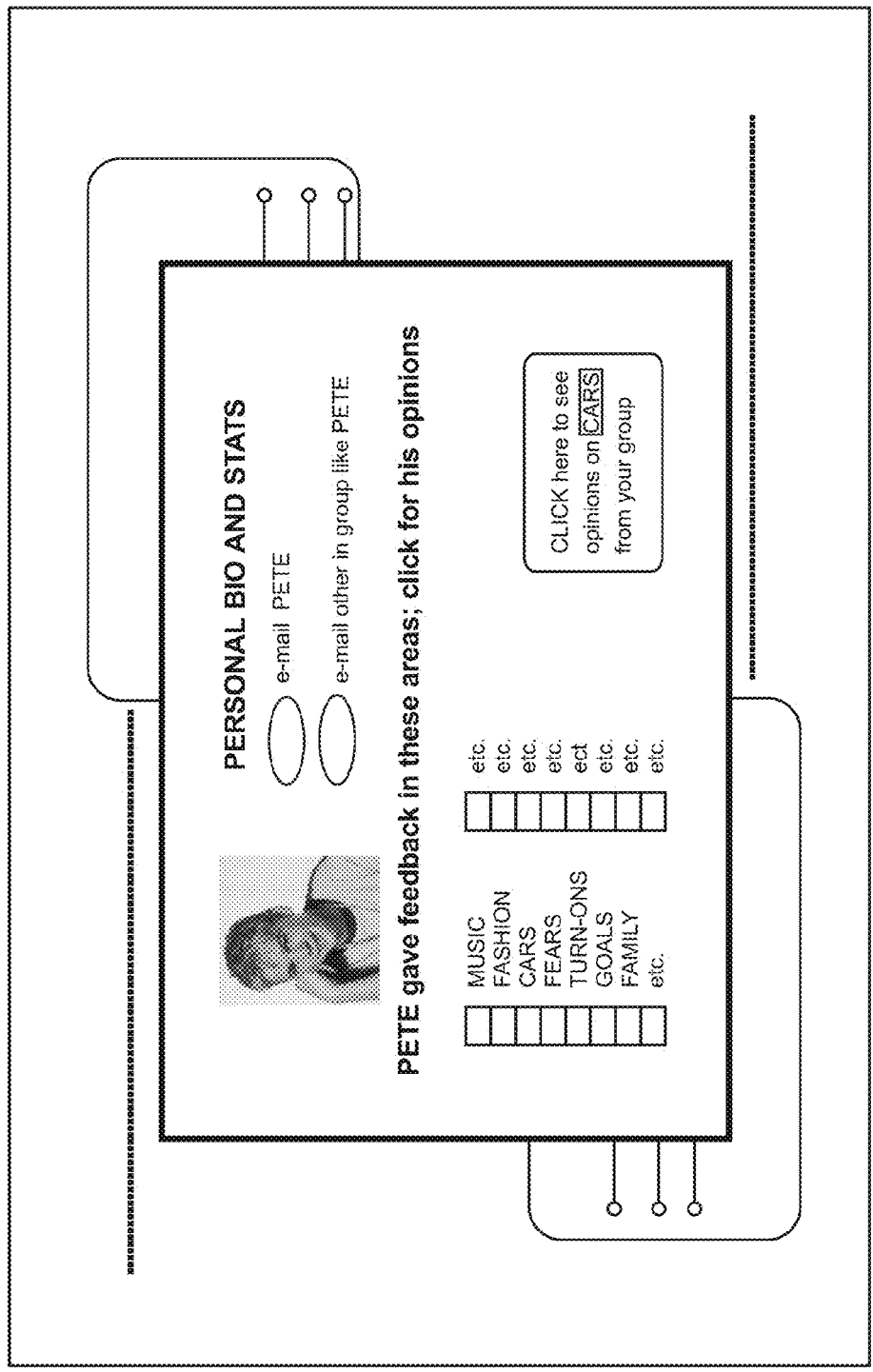

Enormously valuable ADVERTISING means are created that transcend existing Internet advertising options, as the present invention targets the messages with not only demographic specificity, but content and topic relevance to each individual user, or searcher. The option of search-relevant FACTOIDS which includes advertising as an aspect of a statistic from the database relevant to the searcher, relevance being a option determined by the database configuration, could provide new interest around advertising messages—each message seemingly personally created and recalled for each searcher/user. These advertising options and values are demonstrated in an example SEARCH in the SCREEN diagrams enclosed. Beyond the ability to target searchers, the ability to connect with members by posting and email means, are powerful:

This area of SERVICE to users and advertisers involves uniquely targeted EMAIL (FIGS. 9, 11 and 13,) messages usable by users or searchers and selectively by advertisers. The option of uniquely assembled, individual user-relevant posting boards (FIG. 9.) As each searcher/user identifies traits and preferences of relevance to their search, a constantly refined group of "most relevant" members to that search is assembled, and revised. With the option of "group e-mail" and group posting boards, messages may be sent by searchers/users selectively to members relevant to a particular phase of their search, to gain the most useful or relevant feedback from the membership. For example, a searcher may want to pose a question to the top ten relevant members who are within their trait-based demographic group, who are diabetic, or who feel FRANK SINATRA was the best male singer ever.

Message postings could appear in unique combinations, by topic or member relevance, as a searcher/user accesses boards. Should a searcher find a preference based topic to be the priority, the potential of posting or reviewing boards related to the topic from the entire database membership is an example of versatility in searching the preferred configuration of sites based on the present invention should embody. Naturally handpicked members could be sent messages selectively, as a function of a closed e-mail system within a service site involving the database of the present invention. Advertisers included based on their demographic desires and selectively by their relevance to a given search, may email and post to their "dream demographics," and likely have their advertising received by the audience with interest and willingness to read and "link." This, because the interest level and relevance to that member was predetermined to be above a selected level, or threshold, by parameters selectively determined as the construct of the database's categorization.

Further disclosure is included in the following presentation style "snapshot" of the invention as used in a configuration, called "SHOP BY PROFILE," including a series of screen examples that demonstrate some of the options a SEARCHER might encounter while searching for preference information about a selected "type" of people who he/she has defined by selected trait variables, input by the SEARCHER. The SCREEN diagrams, which demonstrate an application of the present invention, are described in the following, in a scenario that encounters and details many of the options for configuration based on the system and method of the present invention, including the versatility and value of the searchable database options, and the advertising and revenue potential of an Internet site configured from aspects of the present invention.

The nature of the present invention is such that one skilled in the art of writing computer executable code (software), will be able to implement the described functions using one or a combination of popular computer programming languages such as "C++," Visual Basic, Java or HTML and/or web application development environments. As discussed above, one of the functions performed by the system is operation as a web site.

A web site typically communicates with web browsers using the hypertext transfer protocol (HTTP) to send and receive data including hypertext mark-up language (HTML) web page data and executable JAVA Applets. Of course, any known data transfer protocol and web site configuration/definition language can be used to implement the present system as shown in the accompanying figures.

Although the present invention is described by way of example herein in terms of a web based system using web browsers and a site processors, the system is not limited to that particular configuration. It is contemplated that the system can be arranged such that user terminals can communicate with, and display data received from the system using any known communication and display method, for example, using a non-Internet browser WINDOWS viewer coupled with local area network protocol such as Internetwork Packet Exchange (IPX).

As shown in FIG. 18, the system in accordance with the present invention includes one or more site processors 110, one or more user terminals 120 and one or more supplier processors 130 coupled together through communication network 145.

Although shown as a single communication network, communication network 145 can be comprised of multiple interconnected networks, for example the Internet. As such, communication network 145 can be any communication network, but is typically the Internet or some other global computer network. Communications between the elements of the present system can be implemented using any known arrangements for accessing the communication network 145, such as dial-up serial line interface protocol/point-to-point protocol (SLIP/PPP), Integrated Services Digital Network (ISDN), dedicated leased-line services, broadband (cable) access, frame relay, Digital Subscriber Line (DSL), asynchronous transfer mode (ATM) or other access techniques.

The user terminals 120 have the ability to send and receive data across communication network 145, and the ability to display the received data on a display device using appropriate communication software such as an Internet web browser. By way of example, terminal 120 may be a personal computer such as an INTEL PENTIUM-based computer or an APPLE MACINTOSH computer, but is not limited to such. Other such terminals which can communicate using a global computer network such as palm top computers, personal digital assistants (PDAs) and mass-marketed Internet access devices, i.e., WEB TV, can be used.

Accordingly the user terminals 120 provide access to the site processor 110 for the purpose of accessing the electronic architecture (database and database management system) of the present invention. The system software which controls the above-described functions relies primarily on the one or more site processors 110. Site processors 110 typically communicate with network 145 across a permanent i.e., unswitched, communication link. Permanent connectivity ensures that access to server 110 is always available to terminals 120.

Site processors 110 can be any appropriately sized computing platform, the storage, processing and other functional capacities of which are determined based on expected user activity and data storage requirements. For example, site processors 110 can be server-type personal computers, minicomputers such as UNIX-based servers, and even mainframe computers.

Supply processors 130 are preferably owned and maintained by the entities of supplying goods and services for marketing. Supply processors 130 are preferably used for receiving demographics, marketing and sales data from site processors 110 and for providing corporate, product and service and other relevant information to site processors 110, terminals 120 and LIVE SHOW processors 140. Further, orders for goods and services placed by users via user/player terminal 120 can be accepted directly from user terminals 120 or via site processors 110.

As shown in FIG. 19, the functional elements of each site processor 110 preferably include a central processing unit (CPU) 150 used to execute software code in order to control the operation of the server, read only memory (ROM) 160, random access memory (RAM) 170, at least one network interface 180 to transmit and receive data to and from other computer devices across communication network 145, storage devices 190 such as a hard disk drive, floppy disk drive, tape drive, CD-ROM, DVD-ROM and the like for storing program code, databases and application data, and one or more input devices 100, such as a keyboard and mouse.

The various components of site processor 110 need not be physically contained within the same chassis or even be located in a single location. For example, the database on storage device 190 may be located at a site which is remote from the remaining elements of site processor 110, and may even be connected to CPU 150 across communication network 145 via network interface 180.

Terminals 120 and supply processors 130 are preferably comprised of the same or subset of the functional components described with respect to the site processors 110. Of course, the functional components of these devices are sized to accommodate capacities appropriate for their usage. For example, terminals 120 may include more sophisticated displays and display driving hardware than the other elements, but may contain a smaller storage device, and less powerful CPU 150 than the other components. Also, supplier processor 130 may contain a more powerful CPU 150 than site processor 110, especially in the case where supplier processor 130 is implemented by a large corporation with a sophisticated Internet presence.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method comprising the steps of:
   (a) storing, on one or more processor readable media that are operatively coupled to one or more processors, at least one database comprising:
      (i) electronic member information including trait information and/or preference information associated with at least one of a plurality of members of a site; and
      (ii) electronic advertiser information comprising information including goods and/or services of one or more advertisers;
   (b) receiving, by the one or more processors via an interactive communication network, video media content relevant to the site from a user computing device associated with at least one of the plurality of members who is not of the one or more advertisers;
   (c) generating, by the one or more processors, first content obtained at least in part from at least part of the video media content;
   (d) providing, by the one or more processors via the interactive communication network to a first computing device associated with a first user, the first content;
   (e) receiving, from the first computing device, by the one or more processors and in response to a prompt from the one or more processors, first information relating to the first content;
   (f) associating, by the one or more processors, the first content with at least some of the electronic advertiser information based at least on the first information;
   (g) generating, by the one or more processors based at least in part on the first information, second content obtained at least in part from the at least part of the video media content and at least some of electronic advertiser information;
   (h) indexing, by the one or more processors, the second content by at least one trait and/or preference from the at least one database, respectively associated with at least one of the plurality of members; and
   (i) providing, by the one or more processors via the interactive communication network to a second computing device associated with a second user, the second content, wherein the second content is searchable as a function of the indexing.

2. The method of claim 1, wherein the video media content comprises at least one of live content, recorded content, linked content and uploaded content.

3. The method of claim 1, further comprising:
   (j) providing, by the one or more processors to a third computing device associated with a third user, at least a portion of the first content; and
   (k) receiving, from the third computing device, by the one or more processors, second information relating to the at least portion of the first content;
   wherein the step (g) generating is further based at least in part on the second information.

4. The method of claim 1, wherein the second content includes at least some of the electronic advertiser information.

5. The method of claim 1, wherein the first information affects at least an aspect of the indexing the second content.

6. The method of claim 1, wherein the first information relates to a preference associated with the first user.

7. The method of claim 1, wherein the video media content includes video that represents an identifier of the first member.

8. The method of claim 1, wherein the video media content features the first user visually within at least some of imagery.

9. The method of claim 1, wherein the second content includes a brand name associated with the at least some of electronic advertiser information.

10. The method of claim 1, wherein the electronic member information further includes identification information associated with at least one of the plurality of members of the site.

11. The method of claim 10, wherein the indexing is further by the identification information.

12. The method of claim 1, further comprising receiving an electronic vote from the second user computing device, wherein the vote represents a preference of the second user.

13. The method of claim 12, wherein the preference relates to the first content.

14. The method of claim 12, wherein the preference relates to at least one participant.

15. The method of claim 12, wherein the vote represents a selection of one of the at least one participant to be featured within the video media content.

16. The method of claim 1, wherein the second content is provided as an electronic catalog associated with at least some of the electronic advertiser information.

17. The method of claim 16, further comprising providing the electronic catalog on the web site, and offering for sale at least one of goods and services associated with the electronic catalog.

18. The method of claim 17, further comprising revising the electronic catalog after the second content has been provided.

19. The method of claim 18, wherein the electronic catalog includes information associated with at least one of the first content and the second content.

20. The method of claim 1, wherein the site is a web site and further comprising featuring at least one of the products and services in at least one of the web site and the first content.

21. The method of claim 1, further comprising offering redeemable credits to the first and second users for transmitting electronic information to the one or more processors, wherein the users redeem the credits for one or more of goods and services associated with at least some of the advertiser information.

22. The method of claim 1, further comprising providing an electronic chat room on the site for the first and second users to communicate via the first and second user computing devices, respectively.

23. The method of claim 22, wherein the chat room is displayed as an aspect of the video media content.

24. The method of claim 1, further comprising providing operability for the first user to receive information related to the second user if the one or more processors determines that the second user is relevant to aspects of at least one of the advertiser information, the trait information, the preference information, a message provided by the second user and the video media content.

25. The method of claim 1, further comprising broadcasting the second content.

26. The method of claim 1, wherein the video media content includes live video.

27. The method of claim 26, further comprising affecting, by the one or more processors, at least some of the live video content by information within a message provided by the first or second user.

28. A system comprising:
a) one or more processor readable media;
b) one or more processors operatively coupled to the one or more processor readable media;
c) at least one database stored on the one or more processor readable media, the at least one database comprising:
  (i) electronic member information including trait information and/or preference information associated with at least one of a plurality of members of a site; and
  (ii) electronic advertiser information comprising information including goods and/or services of one or more advertisers;

d) the one or more processor readable media further have instructions for causing the following steps to be performed by the one or more processors:
  (i) receiving, by the one or more processors via an interactive communication network, video media content relevant to the site from a user computing device associated with at least one of the plurality of members who is not of the one or more advertisers;
  (ii) generating, by the one or more processors, first content obtained at least in part from at least part of the video media content;
  (iii) providing, by the one or more processors via an interactive communication network to a first computing device associated with a first user, the first content;
  (iv) receiving, from the first computing device, by the one or more processors and in response to a prompt from the one or more processors, first information relating to the first content;
  (v) associating, by the one or more processors, the first content with at least some of the electronic advertiser information based at least on the first information;
  (vi) generating, by the one or more processors based at least in part on the first information, a second content obtained at least in part from the at least part of the video media content and at least some of electronic advertiser information;
  (vii) indexing, by the one or more processors, the second content by at least one trait and/or preference from the at least one database respectively associated with at least one of the plurality of members; and
  (viii) providing, by the one or more processors via the interactive communication network to a second computing device associated with a second user, the second content, wherein the second content is searchable as a function of the indexing.

29. The system of claim 28, wherein the video media content comprises at least one of live content, recorded content, linked content and uploaded content.

30. The system of claim 28, wherein the one or more processor readable media further have instructions for causing the following steps to be performed by the one or more processors:
  (ix) providing, by the one or more processors to a third computing device associated with a third user, at least a portion of the first content; and
  (x) receiving, from the third computing device, by the one or more processors, second information relating to the at least portion of the first content;
  wherein the step (vi) generating is further based at least in part on the second information.

31. The system of claim 28, wherein the second content includes at least some of the electronic advertiser information.

32. The system of claim 28, wherein the electronic member information further includes identification information associated with at least one of the plurality of members of the site.

33. The system of claim 32, wherein the indexing is further by the identification information.

* * * * *

UNITED STATES PATENT AND TRADEMARK OFFICE
CERTIFICATE OF CORRECTION

PATENT NO. : 8,447,648 B1  
APPLICATION NO. : 12/507549  
DATED : May 21, 2013  
INVENTOR(S) : Craig P. Mowry Page 1 of 1

It is certified that error appears in the above-identified patent and that said Letters Patent is hereby corrected as shown below:

In the Specification,

Column 32, line 31, the text "(FIG. 11.5.)" should be "(FIG. 11B)."

Signed and Sealed this
Second Day of June, 2015

Michelle K. Lee
*Director of the United States Patent and Trademark Office*